(12) United States Patent
Williams et al.

(10) Patent No.: US 11,982,558 B2
(45) Date of Patent: May 14, 2024

(54) APPARATUS, SYSTEM, AND METHOD OF PROVIDING A CONTENT LEVEL MONITOR

(71) Applicant: NYPRO INC., Clinton, MA (US)

(72) Inventors: Amanda Williams, St. Petersburg, FL (US); Julio Daniel Oropeza, St. Petersburg, FL (US); Yu-Chang Lee, St. Petersburg, FL (US); Ying Hao Lee, St. Petersburg, FL (US); Martin Johnson, St. Petersburg, FL (US); Marc Theeuwes, St. Petersburg, FL (US); Stefan Vaes, St. Petersburg, FL (US); Toon Diels, St. Petersburg, FL (US)

(73) Assignee: NYPRO INC.

( * ) Notice: Subject to any disclaimer, the term of this patent is extended or adjusted under 35 U.S.C. 154(b) by 0 days.

(21) Appl. No.: 17/952,010

(22) Filed: Sep. 23, 2022

(65) Prior Publication Data
US 2023/0083415 A1     Mar. 16, 2023

Related U.S. Application Data

(63) Continuation of application No. 17/052,773, filed as application No. PCT/US2019/030592 on May 3, 2019, now abandoned.
(Continued)

(51) Int. Cl.
| | |
|---|---|
| *G01F 23/24* | (2006.01) |
| *B65D 25/56* | (2006.01) |
| *G01F 15/061* | (2022.01) |
| *G01F 23/18* | (2006.01) |
| *G01F 23/26* | (2022.01) |

(52) U.S. Cl.
CPC .......... *G01F 15/061* (2013.01); *B65D 25/56* (2013.01); *G01F 23/18* (2013.01); *G01F 23/24* (2013.01); *G01F 23/26* (2013.01)

(58) Field of Classification Search
None
See application file for complete search history.

(56) References Cited

U.S. PATENT DOCUMENTS

| | | |
|---|---|---|
| 1,078,214 A | 11/1913 | Patnaude |
| 3,553,471 A | 1/1971 | Maigret |
| (Continued) | | |

FOREIGN PATENT DOCUMENTS

| | | |
|---|---|---|
| CN | 1121700 | 5/1996 |
| CN | 1259090 | 7/2000 |
| (Continued) | | |

OTHER PUBLICATIONS

Chinese Office Action issued in App. No. CN202210122381, dated Sep. 23, 2023, 4 pages.
(Continued)

*Primary Examiner* — Herbert K Roberts
(74) *Attorney, Agent, or Firm* — Riverside Law LLP

(57) ABSTRACT

An apparatus, system and method for providing a consumable level monitor for association with a content-filled consumable. The embodiments may include a sensing module suitable to sense the consumable level; and a communications module suitable for receiving the consumable level from the sensing module, and for communicating the consumable level to a user.

20 Claims, 20 Drawing Sheets

Related U.S. Application Data

(60) Provisional application No. 62/666,608, filed on May 3, 2018.

(56) References Cited

U.S. PATENT DOCUMENTS

| | | | |
|---|---|---|---|
| 4,874,023 | A | 10/1989 | Ulm |
| 4,991,635 | A | 2/1991 | Ulm |
| 5,005,407 | A | 4/1991 | Koon |
| 5,213,597 | A | 5/1993 | Campbell |
| 5,277,337 | A | 1/1994 | Ford |
| 5,368,197 | A | 11/1994 | Sutera |
| 5,383,574 | A | 1/1995 | Raphael |
| 5,544,770 | A | 8/1996 | Travisano |
| 5,636,762 | A | 6/1997 | Juhola |
| 5,641,006 | A | 6/1997 | Autrey |
| 6,095,370 | A | 8/2000 | Rhine |
| 6,554,382 | B1 | 4/2003 | Sleger |
| 6,741,180 | B2 | 5/2004 | Lassota |
| 6,820,772 | B1 | 11/2004 | Bennett, Jr. |
| 7,000,468 | B2 | 2/2006 | Doorhy |
| 7,107,838 | B2 | 9/2006 | Chai |
| 7,258,005 | B2 | 8/2007 | Nyce |
| 7,331,487 | B2 | 2/2008 | Macler, II |
| 7,401,513 | B2 | 7/2008 | Szela |
| 7,506,576 | B1 | 3/2009 | Lassota |
| 7,562,571 | B2 | 7/2009 | Raffalt |
| 7,654,421 | B2 | 2/2010 | Chan |
| 7,661,307 | B1 | 2/2010 | Milone |
| 7,712,364 | B2 | 5/2010 | Radhakrishnan |
| 7,798,373 | B1 | 9/2010 | Wroblewski |
| 8,014,789 | B2 | 9/2011 | Breed |
| 8,159,660 | B2 | 4/2012 | Mimeault |
| 8,177,096 | B2 | 5/2012 | Macler |
| 8,382,913 | B2 | 2/2013 | Classen |
| 8,387,455 | B1 | 3/2013 | Kaminski |
| 8,429,965 | B2 | 4/2013 | Radhakrishnan |
| 8,464,584 | B2 | 6/2013 | Lassota |
| 8,464,906 | B2 | 6/2013 | Macler |
| 8,469,050 | B2 | 6/2013 | King |
| 8,931,340 | B2 | 1/2015 | Wiederkind-Klein |
| 8,966,973 | B1 | 3/2015 | Milone |
| 8,980,014 | B2 | 3/2015 | Classen |
| 9,052,227 | B1 | 6/2015 | Lassota |
| 9,138,091 | B2 | 9/2015 | Zhao |
| 9,153,119 | B2 | 10/2015 | Stapleford |
| 9,212,042 | B2 | 12/2015 | Veltrop |
| 9,261,395 | B2 | 2/2016 | Shearer |
| 9,311,806 | B2 | 4/2016 | Hazen |
| 9,417,635 | B2 | 8/2016 | Hampton |
| 9,459,132 | B2 | 10/2016 | Fehrenbach |
| 9,476,752 | B2 | 10/2016 | Vilag |
| 9,488,513 | B2 | 11/2016 | Kumar |
| 9,510,727 | B2 | 12/2016 | Classen |
| 9,610,001 | B2 | 4/2017 | Classen |
| 9,658,095 | B2 | 5/2017 | Winkens |
| 9,911,306 | B2 | 3/2018 | Tshilombo |
| 9,952,082 | B2 | 4/2018 | Schwartz |
| 10,114,139 | B1 | 10/2018 | Mirisharif |
| 11,280,042 | B2 | 3/2022 | Williams |
| 2002/0020449 | A1 | 2/2002 | Imai |
| 2002/0145527 | A1 | 10/2002 | Lassota |
| 2002/0161652 | A1 | 10/2002 | Paullin |
| 2004/0199131 | A1 | 10/2004 | Kitamura |
| 2005/0067434 | A1 | 3/2005 | Yu |
| 2005/0162277 | A1 | 7/2005 | Teplitxky |
| 2005/0172712 | A1 | 8/2005 | Nyce |
| 2006/0033630 | A1 | 2/2006 | Lyall, III |
| 2008/0036615 | A1* | 2/2008 | Lyall, III ............. B67D 3/045 340/614 |
| 2008/0277414 | A1 | 11/2008 | Macler |
| 2009/0031798 | A1 | 2/2009 | Radhakrishnan |
| 2009/0158841 | A1 | 6/2009 | Winkens |
| 2009/0187357 | A1 | 7/2009 | Ho |
| 2009/0212069 | A1 | 8/2009 | Lassota |
| 2009/0294469 | A1* | 12/2009 | Poulain ................ G01G 13/00 222/64 |
| 2010/0209313 | A1 | 8/2010 | Davis |
| 2011/0166699 | A1 | 7/2011 | Palmquist |
| 2011/0265562 | A1 | 11/2011 | Li |
| 2011/0314907 | A1 | 12/2011 | Wiedekind-Klein |
| 2012/0067920 | A1 | 3/2012 | Veltrop |
| 2012/0193373 | A1 | 8/2012 | Macler |
| 2012/0218106 | A1 | 8/2012 | Zaima |
| 2012/0305605 | A1 | 12/2012 | Vassaux |
| 2013/0036815 | A1 | 2/2013 | Bernhardsgruetter |
| 2013/0206011 | A1 | 8/2013 | Ozanne |
| 2013/0269832 | A1 | 10/2013 | Gengerke |
| 2013/0276533 | A1 | 10/2013 | Wilder |
| 2013/0285681 | A1 | 10/2013 | Wilson |
| 2013/0334214 | A1 | 12/2013 | Yogev |
| 2013/0344206 | A1 | 12/2013 | Yoakim |
| 2014/0014684 | A1 | 1/2014 | Classen |
| 2014/0152323 | A1 | 6/2014 | Kumar |
| 2014/0354438 | A1 | 12/2014 | Hazen |
| 2015/0021360 | A1 | 1/2015 | Veltrop |
| 2015/0090625 | A1 | 4/2015 | Bauss |
| 2015/0122015 | A1 | 5/2015 | Leppard |
| 2015/0129039 | A1 | 5/2015 | Mulvaney |
| 2015/0329347 | A1 | 11/2015 | Veldhi |
| 2015/0366411 | A1 | 12/2015 | Yang |
| 2016/0003615 | A1 | 1/2016 | Biswas |
| 2016/0007798 | A1 | 1/2016 | Jimenez |
| 2016/0047683 | A1 | 2/2016 | Winkens |
| 2016/0146659 | A1 | 5/2016 | Saltzgiver |
| 2016/0230625 | A1 | 8/2016 | Bradford |
| 2016/0257554 | A1 | 9/2016 | Manwani |
| 2016/0286993 | A1 | 10/2016 | Pau |
| 2017/0135530 | A1 | 5/2017 | MacLeod |
| 2017/0161676 | A1 | 6/2017 | Aji |
| 2017/0228519 | A1 | 8/2017 | Chu |
| 2017/0278059 | A1* | 9/2017 | Aji ....................... G06K 7/10297 |
| 2017/0299416 | A1 | 10/2017 | Rondano |
| 2017/0299417 | A1 | 10/2017 | Otagaki |
| 2017/0328761 | A1* | 11/2017 | Schwartz ............... G01F 23/266 |
| 2018/0080807 | A1 | 3/2018 | Singh |
| 2018/0099850 | A1 | 4/2018 | Lyons |
| 2018/0100754 | A1 | 4/2018 | Kumar |
| 2018/0111145 | A1 | 4/2018 | Ophardt |
| 2018/0132643 | A1 | 5/2018 | Shklar |
| 2018/0228977 | A1* | 8/2018 | Schabbach ............... A61M 5/20 |
| 2018/0266866 | A1 | 9/2018 | Biswas |
| 2018/0266873 | A1 | 9/2018 | Goodier |
| 2018/0303271 | A1 | 10/2018 | Glucksman |
| 2018/0321072 | A1 | 11/2018 | Williams |
| 2018/0326661 | A1 | 11/2018 | Johnson |
| 2018/0344070 | A1 | 12/2018 | Perrelli |
| 2019/0021529 | A1 | 1/2019 | Schucker |

FOREIGN PATENT DOCUMENTS

| | | |
|---|---|---|
| CN | 1452107 | 10/2003 |
| CN | 1508738 | 6/2004 |
| CN | 1784354 | 6/2006 |
| CN | 101573063 | 11/2009 |
| CN | 202126296 | 1/2012 |
| CN | 102421697 | 4/2012 |
| CN | 202915989 U | 5/2013 |
| CN | 103253310 | 8/2013 |
| CN | 105203185 | 12/2015 |
| CN | 105813519 | 7/2016 |
| CN | 105939643 | 9/2016 |
| CN | 106017637 | 10/2016 |
| CN | 205642549 | 10/2016 |
| CN | 206252346 U | 6/2017 |
| CN | 107040260 | 8/2017 |
| CN | 107634885 | 1/2018 |
| DE | 102012200949 | 7/2013 |
| EP | 1270501 A1 * | 1/2003 ........... B67D 1/0004 |
| EP | 2180299 A1 | 4/2010 |
| EP | 2282184 A1 | 2/2011 |
| EP | 3244175 | 11/2017 |
| EP | 3263000 | 1/2018 |
| GB | 2059596 A | 4/1981 |

(56) References Cited

FOREIGN PATENT DOCUMENTS

| | | |
|---|---|---|
| GB | 2099791 | 11/1984 |
| GB | 0200167 | 2/2002 |
| GB | 2383845 A | 7/2003 |
| HK | 1211782 | 5/2016 |
| JP | H09174039 | 7/1997 |
| JP | 2002039838 | 2/2002 |
| JP | 2012101796 | 5/2012 |
| KR | 20010082146 | 8/2001 |
| KR | 20100009743 A | 1/2010 |
| KR | 20120050987 | 5/2012 |
| WO | 9965818 | 12/1999 |
| WO | 2005092012 | 10/2005 |
| WO | 2006044782 | 4/2006 |
| WO | 2011127334 | 10/2011 |
| WO | 2014096405 | 6/2014 |
| WO | 2018204720 | 11/2018 |

OTHER PUBLICATIONS

International Preliminary Report on Patentability, dated Nov. 5, 2019 for PCT/US2018/030987.

International Search Report and Written Opinion dated Aug. 27, 2018 in PCT/US2018/030987.

Parashar, Mohita et al., "Water Level Monitoring System in Water Dispensers using IoT", IRJET, (20180400), vol. 05, ISSN 2395-0056, pp. 1217-1220, XP055756965.

Chinese Office Action issued in App. No. CN20198037470, dated Oct. 11, 2023, 9 pages.

Chinese Office Action issued in App. No. CN20198037889, dated Oct. 10, 2023, 8 pages.

EPO Communication pursuant to Article 94(3) issued in App. No. EP19796780, dated Dec. 13, 2023, 5 pages.

\* cited by examiner

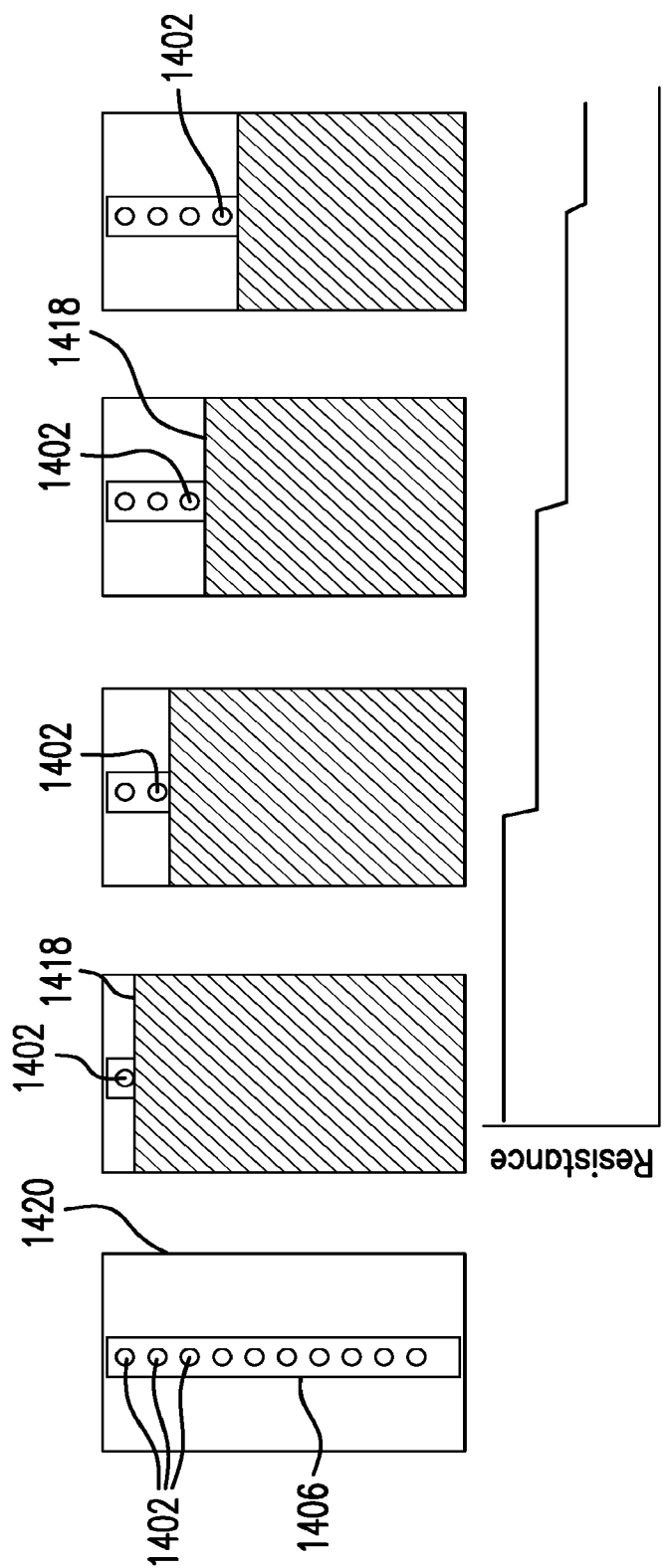

APPARATUS, SYSTEM, AND METHOD OF PROVIDING A CONTENT LEVEL MONITOR

CROSS-REFERENCE TO RELATED APPLICATION

This continuation application claims priority to U.S. application Ser. No. 17/052,773, filed Nov. 3, 2020, entitled: APPARATUS, SYSTEM, AND METHOD OF PROVIDING A CONTENT LEVEL MONITOR, which is a national stage application of International Patent Application No. PCT/US2019/030592, filed May 3, 2019, entitled: APPARATUS, SYSTEM, AND METHOD OF PROVIDING A CONTENT LEVEL MONITOR, which claims the benefit of priority to U.S. Provisional Application No. 62/666,608, filed May 3, 2018, entitled APPARATUS, SYSTEM, AND METHOD OF PROVIDING A CONTENT LEVEL MONITOR, the entirety of which is incorporated herein by reference as if set forth in its entirety.

BACKGROUND

Field of the Disclosure

The disclosure relates generally to sensing, and, more particularly, to an apparatus, system, and method of monitoring content levels and indicating a need for replenishment.

Background of the Disclosure

It is well understood that various types of contents, such as solids and liquids, may be carried within containers designed to dispense those contents over extended time periods in discreet doses. By way of nonlimiting example, detergent for use in a washing machine is often provided in liquid form, and a large bottle, such as having a spigot or other output type to allow for the dispensing of the detergent outwardly from the bottle, enables dispensing of that dose of detergent into a load of laundry within the washer. Similarly, such as in an office environment, a large bottle is used to provide water at a "water cooler", and the water is dispensed responsive to independent actuations of a spigot.

In general, contents ultimately placed within the container may be tracked, in bulk, prior to delivery to or purchase by the ultimate consumer. For example, bulk tracking may be performed on farmed goods as they are farmed, and as they are shipped for distribution; warehoused solids may be tracked by production date, such as by UPC code or the like, and/or such as by warehoused pallet, and so on; once the goods reach a sales center, such as a grocery store, they may be tracked, such as by UPC code or the like, from an inventory perspective; but, once the contents reach the consumer and/or are otherwise placed into a container, such as for consumption, or when the contents are consumed from a purchased container, there are no longer readily available tracking methodologies at present.

However, in embodiments such as the aforementioned, it is often the case that, for a user to monitor how much content remains in the container, the user must periodically shake, lift, or otherwise manipulate the container to allow for a qualified guess by the user as to how much content remains therein. Further, there is historically no methodology whereby proper dosing for use of the content, such as per load dosing into a washing machine, may be readily assessed. Unfortunately, in a washing machine embodiment by way of example, too little soap may cause an inadequate level of cleaning of clothes placed within the washing machine, and too much soap may cause over-sudsing, which may damage the washing machine or the laundry area. Yet further, there is presently no mechanism whereby a seller of a containers having consumable contents, such as dishwashing or laundry detergent, or water cooler bottles, can assess a consumer's need for additional contents.

Therefore, the need exists for an apparatus, system, and method of monitoring content levels within a consumable container, such as a bottle or box, and of automatically indicating (herein referred to as "autoreplenishment"), such as to at least one of a consumer and/or a seller of the contents, when the need for additional contents and/or a consumable containing the contents occurs.

SUMMARY

The embodiments are and include at least an apparatus, system and method for providing a consumable level monitor for association with a content-filled consumable. The embodiments may include a sensing module suitable to sense the consumable level; and a communications module suitable for receiving the consumable level from the sensing module, and for communicating the consumable level to a user.

BRIEF DESCRIPTION OF THE DRAWINGS

The disclosure is illustrated by way of example and not limitation in the accompanying drawings, in which like references indicate similar elements, and in which:

FIGS. 15A and 15B illustrate aspects of the embodiments;

DETAILED DESCRIPTION

Figure 1A:
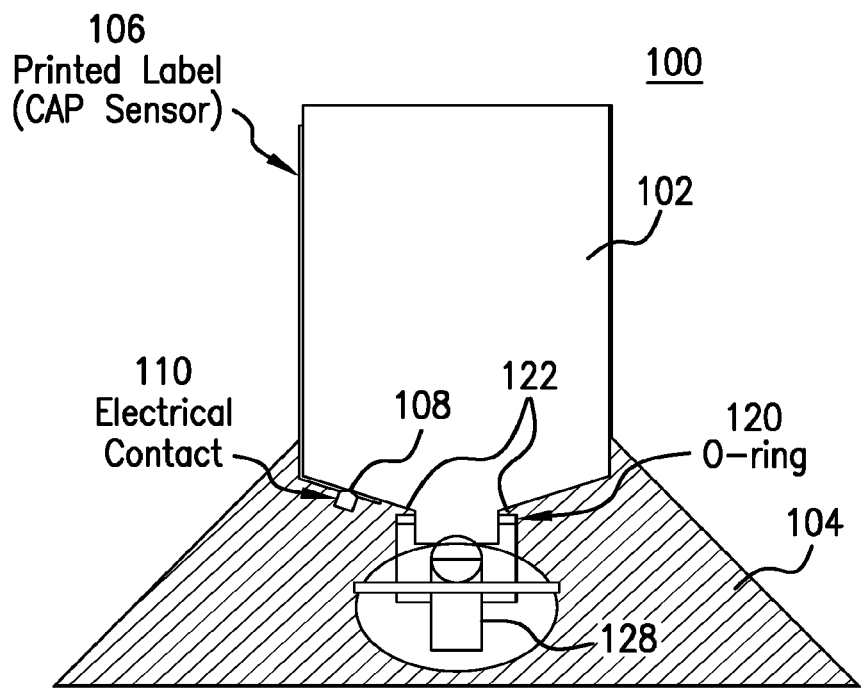
FIGS. 1A and 1B illustrate a front view and side view of a consumable and dispenser system.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide networked access to a plurality of types of digital content, including but not limited to video, image, text, audio, metadata, algorithms, interactive and document content, and which track, deliver, manipulate, transform and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

Furthermore, it will be understood that the term "module" as used herein does not limit the functionality to particular physical modules, but may include any number of tangibly-embodied software and/or hardware components having a transformative effect on at least a portion of a system. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (which may work in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

Embodiments may include a liquid level monitoring apparatus, system, and method, as well as an auto replenishment apparatus, system, and method for liquids typically contained within a consumable, such as a bottle, for which monitoring of the level of those liquids has not historically occurred. The embodiments may include a stand-alone dispenser, such as a base having a liquid output, that is distinct from the one or more liquid consumables, and which may include one or more printed circuit boards, firmware, network communication capabilities, user interfaces and indicators, provided power, and a spigot for dispensing liquid from a consumable associated with the dispenser. The embodiments of the dispenser may be associated with one or more consumables or similar packages, such as may be formed of plastic, glass, paper, or pulp, and which may have associated there with one or more electronic labels having sensing capabilities.

Embodiments may also include a solids level monitoring apparatus, system, and method, as well as an auto replenishment apparatus, system, and method for solids typically within a container, for which monitoring of the level of those solids has not historically occurred. The embodiments may include a stand-alone base that is distinct from the one or more containers, and which may include one or more printed circuit boards, firmware, network communication capabilities, user interfaces and indicators, provided power, and/or a dispenser for dispensing solids from a container associated with the base. The embodiments of the base may be associated with one or more types of containers, such as may be formed of plastic, cardboard, or glass, and may extend upward into contact, in part or in whole, with one or more aspects of the container placed into the base, such that the container is brought into contact with aspects of the base in order that the functionality discussed herein may be provided. Of note, the container may have associated there with one or more aspects, such as electronic labels, to provide the functionality herein, either discretely or in conjunction with the encompassing and electronic aspects of the base, as described throughout.

That is, as used herein, the disclosed systems and methods may include two aspects, as discussed throughout. More particularly, the first aspect may be a "consumable", such as the food and liquids containers discussed herein, which may include a disposable good comprised of a package which includes therein a solid or liquid for consumption by user. The consumable may be rigid or flexible, and may be or include, by way of non-limiting example, a bottle, cartridge, bag, jar, such as with a closure, a disposable dispenser, a box, such as may be formed of cardboard, or the like.

Also included within the system may be the durable aspect such as the dispensing units discussed throughout, by way of example, such as may be physically and/or communicatively associated with a consumable. The durable may, as referenced above, also include communication capabilities. Unlike the consumable, the durable aspect may have a usable life that spans the exhaustion of a plurality of consumables, such as over a predetermined time period, such as over the course of a month, a year, or the like.

Further, included in the embodiments may be: cloud based storage and communication with one or more of the dispensers; one or more smartphone apps for communication with the one or more dispensers and/or the cloud based communication site; and an analytics dashboard, which may be app and/or web-based, such as may be used by a seller of the solid or liquid contents and/or the containers thereof. As used herein, a "liquid level", "solids level", or "contents level" monitored in the disclosed apparatuses, systems and methods is indicative of the amount of contents remaining in a consumable associated with aspects of the embodiments; a "dose" is an amount of contents dispensed, such as from the liquid output/spigot/crank, for a given purpose; and an "auto replenishment" may occur when the contents level in the consumable reaches a point at which a reorder is required.

More particularly, a sensing microprocessor, and the requisite processing power, may be resident in the durable dispenser. Because the device must sense content levels inside a consumable, the consumable may have associated therewith, either aftermarket or following manufacture, and by direct printing or in-label, a smart label having sensing, such as conductive or photosensitive strips or connective discrete sensors, covering some portion of the consumable on at least one side thereof. These conductive traces may become communicative with the sensing system upon, and only upon, installation of the consumable into the durable dispenser. Needless to say, a snug electromechanical connection with the dispenser may be provided for the consumable, and/or for variably sized consumables, via any known method. This connection may occur only upon insertion of the consumable into the dispenser, such as by a spring-loaded connector that snugs around a bottleneck, and/or by using a keying mechanism, such as a slot, associated with the consumable to ensure insertion of the consumable at a proper orientation into the dispenser to allow for an electromechanical connection, or using other like methods, by way of example.

Thereby, the embodiments may provide a sensing solution that "wakes up" only when the consumable is plugged into a durable, permanent or semi-permanent, dispenser. Moreover, the embodiments allow for enhanced convenience and control by the user, such as by communicatively associating with the circuitry referenced herein of one or more apps having resident therein settings that may be adjusted by a user, such as for dosing of the contents within the consumable. Further, the communication capabilities disclosed herein may allow for enhanced value to sellers, such as by increasing brand loyalty, reorder frequency, and by providing experiential use data, by way of non-limiting example. In turn, it will be understood in light of the disclosed embodiments that the value to a user may be further enhanced, such as by providing for the offering of discounts from a brand monitoring usage levels to a high-volume user, or the like.

The consumable disclosed in the embodiments may be of any suitable type to allow for reception by the durable dispenser. For example, the consumable may hold between 1 and 3 L, and/or between 1 and 5 gallons, of liquid, and may have a substantially or semi-cylindrical, rectangular, or like shape. The consumable may be of any color or composition that will allow for the sensing discussed herein. The consumable may have associated therewith printed traces or sensors that may extend substantially along the length/height of the consumable to allow for sensing, such as capacitive or photoresistive sensing, by way of non-limiting example. The labels may be also pressure sensitive and/or adhesive, or of a polymer composition suitable for in-mold labeling, and may be applied aftermarket or during the manufacturing and labeling process. These traces may electrically associate with electrodes in the dispenser in order to provide a signal or signals indicative of the requisite contents level sensing.

The dispenser may include a dispenser, such as a spout, crank, spigot, pump, or the like, for the dispensing of the contents from a consumable received into the dispenser. The dispenser may be, by way of non-limiting example, plastic in composition, and may be substantially injection molded, such as with one or more actuation elements, such as a handle, switch, crank, button, or the like. The dispenser may include the aforementioned electrodes for associating with the sensor strips on the label physically present on the consumable associated with the dispenser. The dispenser may include one or more printed circuit boards having a connector to the electrodes suitable for receiving signals from the sensors on the consumable label; a sensor module; one or more indicator LEDs to indicate dosage, level and/or auto replenishment; one or more network communication capable modules, such as for communicating with a smart phone, local area network, cellular network, or the like; one or more power modules to provide power to the dispenser modules and the consumable sensor circuit, and which may include batteries that may be permanent/semipermanent (i.e., rechargeable) or replaceable; and or other optional elements, such as one or more audio alarms to support or replace the LED indicators of correct dosage or auto replenishment.

Further included may be firmware and software to provide the functionality discussed throughout. For example, firmware may sense the contents level based on the intercommunication of the sensing chip and the conductive traces, and may use this information to indicate dosing or auto replenishment. Likewise, dosing, and perhaps auto replenishment, may be information provided remotely from cloud-based algorithms to the firmware of the dispenser.

The disclosed communication capabilities may include communication with one or more smartphone apps having user information associated therewith, and which may receive user feedback regarding content levels, dosing, auto replenishments, and so on. Such a smart phone app may communicate with the dispenser via, for example, WiFi, Bluetooth, BLE, or cellular communication methodologies, and further, the firmware of the dispenser may be suitable to batch information and data and/or otherwise piggyback to a smart phone having resident thereon the referenced app.

Further, a cloud-based backend may store and serve received data to and from the aforementioned app, and to or from one or more web-based or app-based dashboards. Some or all of the additional processing discussed throughout may be performed at the cloud based backend, such as alerts or email confirmations in the circumstances of auto replenishment, such as instead of drawing on the limited resources of the dispenser's firmware or processors.

The aforementioned dashboard may be associated with one or more sellers or brands of the referenced contents within the consumable. In such circumstances, an analytics dashboard may be available to the brand for user and use data indicative of certain geography use, global use, use at times of the day, use by demographic area, or the like. This and additional information provided at the dashboard may allow for a brand to target or otherwise send special offers, discount codes, or the like to particular users, such as high-volume users.

Various of the disclosed embodiments may have associated therewith one or more functional needs. By way of non-limiting example, mechanical and electromechanical functionality may include: dispensing of the contents when the spout or similar output is held in the open position, without leaking in the open or closed position; placement of the content output to enable dispensing of contents "below level", such as into a pitcher or other large container; in the event replaceable, rather than rechargeable or permanent batteries are used, a battery compartment may be included to allow for periodic changing of the batteries, such as without special tools or the risk of breakage (for example, the battery compartment may open using a simple flat or Phillips' head screwdriver).

Of course, a key electro-mechanical functionality may include detection of the contents level within the consumable. This may be done using the aforementioned photoresistive or capacitive sensing, such as via electrodes in the dispenser associated with a sensor, such as a flexible and/or printed circuit on the consumable. Similarly, a pressure sensitive label, having printed electrodes associated therewith, may be employed. In each such case, the sensing processor may preferably be included within the dispenser and connectively associated with the sensor elements of the consumable's label.

Further, the firmware of the dispenser may indicate when an adequate dose of contents for a particular circumstance has been dispensed, i.e., a proper "dosage event". For example, the firmware of the printed circuit board may blink one or more LEDs for a proper dosage timeframe, or may audibly indicate, such as using a low-level buzzer, for the length of the dose or when a dose should be stopped. Dose size may be set up using the app or a web-based application, such as in small, medium, and large, increments, and those increments may be particularly associated, such as by a manufacturer's specifications, with a particular machine, such as a particular washing machine brand and model. Alternatively, dosing may be hard coded into the firmware, such as for a given consumable size typically received by the dispenser, such as a 32 ounce consumable.

Moreover, the firmware, such as absent intercommunication with the cloud or in association with cloud communication, may indicate and/or otherwise trigger an autoreplenishment event. This auto replenishment may be automatic or semi-automatic—a semi-automatic autoreplenishment event may show a confirmation dialogue or other alert to the user, such as in the app, which may allow for the user to cancel or confirm the order; or, the auto replenishment order may be fully automated. An autoreplenishment event may be communicated to the referenced cloud backend, such as subject to an additional confirmation, such as by an app alert or an email, to the ordering consumer. Further, such an auto replenishment event may contribute to the data that may be provided to a brand, such as on the brand dashboard. Data associated with an autoreplenishment may include date, time, location, and/or user ID of the app associated with the auto replenishment, percent content level (which may be automatic as an autoreplenishment threshold, or which may be set by the user), product SKU, or the like.

Functionality for the cloud may include storage of content level updates, dosage events, and auto replenishment events. Further, cloud functionality may include user activity data, interactivity, reset capability, and the like. Decisions, such as the reaching of thresholds for discounts, may optionally occur in the cloud, and the brand dashboard may be enabled to approve such discounts to send, such as for receipt by the consumer app, discount codes and/or other targeted advertising to select consumers. Select consumers may be particular consumers meeting certain data thresholds, classes of consumers, app profile information, or the like.

Auto replenishment events available in the dashboard may be provided in list, mapped, or threshold formats, by way of non-limiting example. Accessing an auto replenishment event may open a particular consumer profile, and may make available to the dashboard all data associated with that profile. Such data, which may be in a map form as referenced above, may include latitude, longitude, location, distance from nearest seller of the brand, use date, use time, percent contents level, machine used with, and the like. Also included in the brand dashboard data may be typical frequency of use, recent frequency of use, time since last use, and so on.

In accordance with the foregoing, there may be numerous mechanical aspects of certain of the disclosed embodiments. For example, one mechanical aspect may include the consumable. The consumable may be associated with a custom, electronically functional, pressure sensitive, photosensitive, and/or capacitive label, by way of example. The label may include printed conductive traces that are suitable for electrical connection to the printed circuit board in the dispenser. The label and/or the bottleneck may additionally include one or more insertion mechanisms to allow for insertion of the consumable having the label thereon into the dispenser, such as positional guides, latches, keys, or the like.

Mechanical aspects of the dispenser may include one or more outputs, such as a crank or spigot. The dispenser may be substantially closed so as to avoid leakage, spill or shock, and may allow for the dispenser output to hang over the edge of a level surface to enable filling of larger containers. Further, the dispenser may be suitable to receive the consumable when the consumable is inverted and placed within, such as top-side down or bottom side open, into the dispenser. As such and in certain embodiments, the consumable may have associated therewith features to simplify interaction with the dispenser. For example, the consumable may be provided with a plastic top cap over the opening of the consumable, and/or a foil seal under the plastic top cap over the opening. Thereby, the plastic cap may be removed and the consumable inverted and placed into the dispenser, and the dispenser may include an element to pierce a seal, such as the foil seal, to allow the contents to be released into the dispenser.

Also relevant to the embodiments may be several electrical aspects. For example, the conductive traces of the consumable label are associated with the electronics in the dispenser, as referenced throughout. This may occur, for example, by the inclusion of a tab along the neck of the consumable, wherein the conductive traces are associated with the tab and the tab inserts into a slot within the dispenser when the consumable is inverted and placed onto the dispenser. Further included within the dispenser is the referenced sensor module that interacts with the label.

Also associated with the dispenser and/or with one or more printed circuit boards therein may be a communication chip or module, such as a BLE or Bluetooth chip/module. This communication module may have associated there with an antenna, such as a printed circuit board trace antenna, to enable network communication from the dispenser. The dispenser may additionally include one or more processors, which may include or be in addition to the network communications chipset and/or the capacitive sensing chipset/module. Also included within the dispenser may be power for the foregoing, such as one or more replaceable batteries, such as coin batteries, AA batteries, or AAA batteries, by way of non-limiting example.

The electrical aspects of the dispenser may include, as referenced throughout, one or more printed circuit boards. Such printed circuit boards may be or include a two-sided board having a 1.6 mm thickness, 1 ounce copper, and Nickel-Gold ENIG finish, by way of non-limiting example. The printed circuit board may have, electrically associated therewith, one or more indicators, such as one or more LED and/or one or more audible indicators.

Firmware aspects of certain of the embodiments may include level sensing algorithms. Further, the level sensing may include interference avoidance techniques to maintain sensing accuracy, such that even if a user touches the conductive traces of the label or the dispenser. Further included within the firmware may be the ability to define and communicate this level sensing. For example, network communications, such as BLE communications, may be included in, or otherwise controlled by, the firmware. As such, the dispenser may be discoverable by a smart phone app, and pairing between the dispenser and the smartphone app may occur. Thereby, level sensed updates may be communicated from the dispenser to the smart phone at appropriate or requested intervals.

The firmware may additionally exchange messages regarding dosing events. For example, the firmware may receive a dosing event indication from the user, the smartphone, or a sensor, and may accordingly blink an LED or activate a buzzer to indicate proper dosing. This dosing may comprise a message uploaded to the firmware, such as wherein the dosing is defined either in the cloud or in the app settings by a user. Yet further, autoreplenishment indications to be generated from the firmware may comprise intelligence within the user app or within the cloud backend. Accordingly, network communications may be triggered by changes in liquid level (such as continuously or periodically), the need for auto replenishment, or the like, and hence communications may occur on fixed time intervals, continuously, or at intervals of variable frequency.

In accordance with the foregoing, the user app may additionally include various aspects. For example, the smart phone at may be enabled to discover and pair with the firmware of the dispenser, such as when the dispenser is activated or on, as mentioned above. The smart phone app may display autoreplenishment requests or confirmation, such as in a user dialogue format. Further, the smart phone app may display a current product level, and the frequency of updates for the product level. Also indicated may be proper dosing and the ability for the user to request dosing.

The app may additionally include the capability to receive discounts and targeted advertising, such as from the brand dashboard. These may be in the form of a push notification or a user dialogue that provides an app alert to accept and/or apply the discount code, such as wherein the discount code may be saved for the next order or applied to a current order. Of course, the app may include the ability to change any one or more of the foregoing settings or any additional settings, such as autoreplenishment settings, such as wherein the liquid level percentage threshold may be varied for an autoreplenishment indication. The app may also allow for changes in dosage settings, machine type, such as washing machine brand and model, liquid dispensing models and machine types, and the receipt of or application of discount codes, and so on. The foregoing may be available from a drop-down or similar menu, a pop-up window, or via any known user interaction, by way of example.

The dashboard referenced herein may additionally include particular aspects. For example, the dashboard may include autoreplenishment event data, particular user information, location-based information, and the like. Further, the dashboard may integrate third-party data, such as weather data, to allow for data fusion between sensed data and publicly available data sources, such as in order to optimize sales.

The dashboard may also include one or more search capabilities. That is, a dashboard user may search for particular data across one or more users, such as "frequent users", "fading users" (i.e., a list of users whose frequency of use has fallen relative to long-term usage), certain geographic searches, usage associated with certain events (such as snowstorms), and the like. Responsive to the search, and otherwise available from within the dashboard, may be a consumer data display. That is, dashboard events, such as autoreplenishment events, may include drill down capabilities to obtain more detail on particular consumers. The drill down may include basic information, such as delivery address or locale, and more particular information, such as dosing events or liquid levels over time.

The dashboard requirements may additionally include an ability to design marketing campaigns and/or discount codes. For example, discount codes may be provided based on the meeting of certain thresholds by certain data of consumers. Thereby, the discount codes may be automatically generated upon the trigger event for one or more consumers, or may be "hard entered" by a person controlling the dashboard. Moreover, the foregoing aspects may overlap, such as wherein discount codes are readily executed, such as responsive to a single click, to all consumers that have been returned responsive to an entered search within the dashboard.

Additional functional requirements may include those of the cloud based backend. The cloud based backend may store data, including autoreplenishment events, dosing events, and product level events, by way of example, and may be suitable to serve that data back to the smart phone app and/or to the dashboard as needed. Further, certain of the decision-making algorithms discussed herein throughout may also reside at the cloud based backend, such as rather than residing in a smart phone app or in association with the dashboard.

Figure 1B:
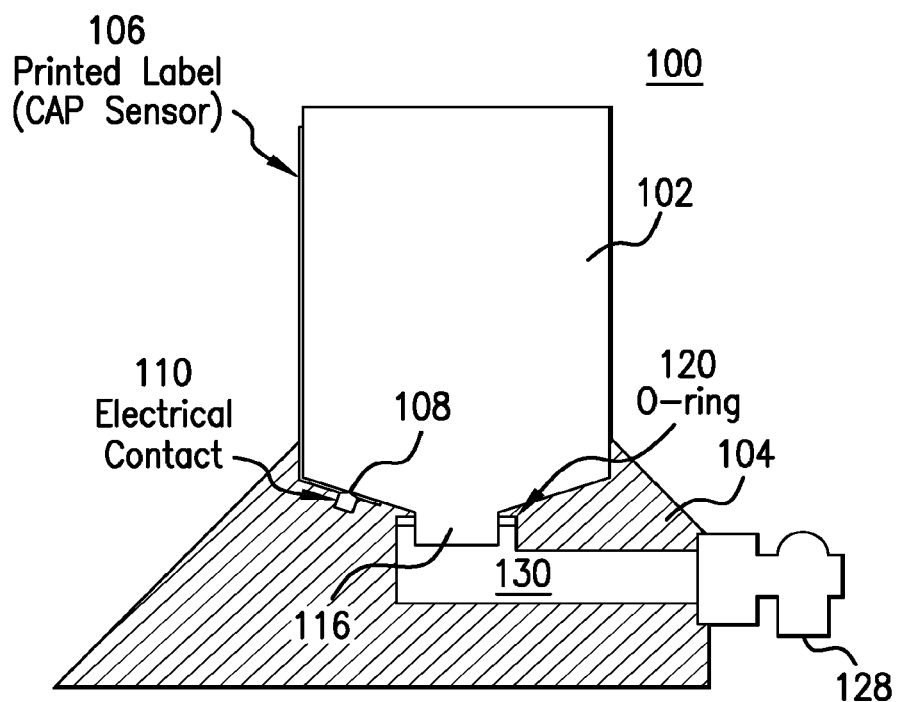

FIGS. 1A and 1B illustrate front and side views, respectively, of a system 100 in which a consumable 102 is associated with a dispenser 104 according to the embodiments. As illustrated, a printed sensing label 106 may be associated with one side of the consumable along its length, and may terminate in an electrical "tab" 108 that, upon association of the consumable 102 with the dispenser 104, electrically connects to an electrical contact 110 in the permanent dispenser. The electrical contact shown may be at a single or multiple positions within the dispenser, such that the need may or may not exist to align the conductive strips 106 with the electrical contact 110 upon insertion of the consumable 102 in order to complete the sensing circuit.

Also as shown, the neck and/or cap portion 116 of the consumable 102 may pass through a leak seal 120 upon association with the dispenser 104, such that liquid within the consumable cannot spill out and overflow the sides of the receiving portion of the dispenser. The leak seal 120 may take the form of an o-ring within the dispenser receiving portion, by way of non-limiting example. Further illustrated in FIG. 1 is a mechanical adjustment 122, such as a spring-loaded orifice, that may snug the neck of the consumable, once inserted through the leak seal 120, into the dispenser 104, such as to further prevent leaks and provide support to hold up the consumable 102.

Also illustrated in association with the dispenser is a liquid output 128, such as a spigot. Of note, the spigot shown is in fluid communication with a fluid pathway 130 that begins on the side of the o-ring/leak preventer 120 opposite the body of the consumable 102, and that terminates on the input side of the spigot. Of note and as will be evident from the illustration of FIGS. 1, the gravitational pull on the liquid provides sufficient downward force/head pressure so that the liquid enters the fluid pathway for output at the spigot.

Figure 2:
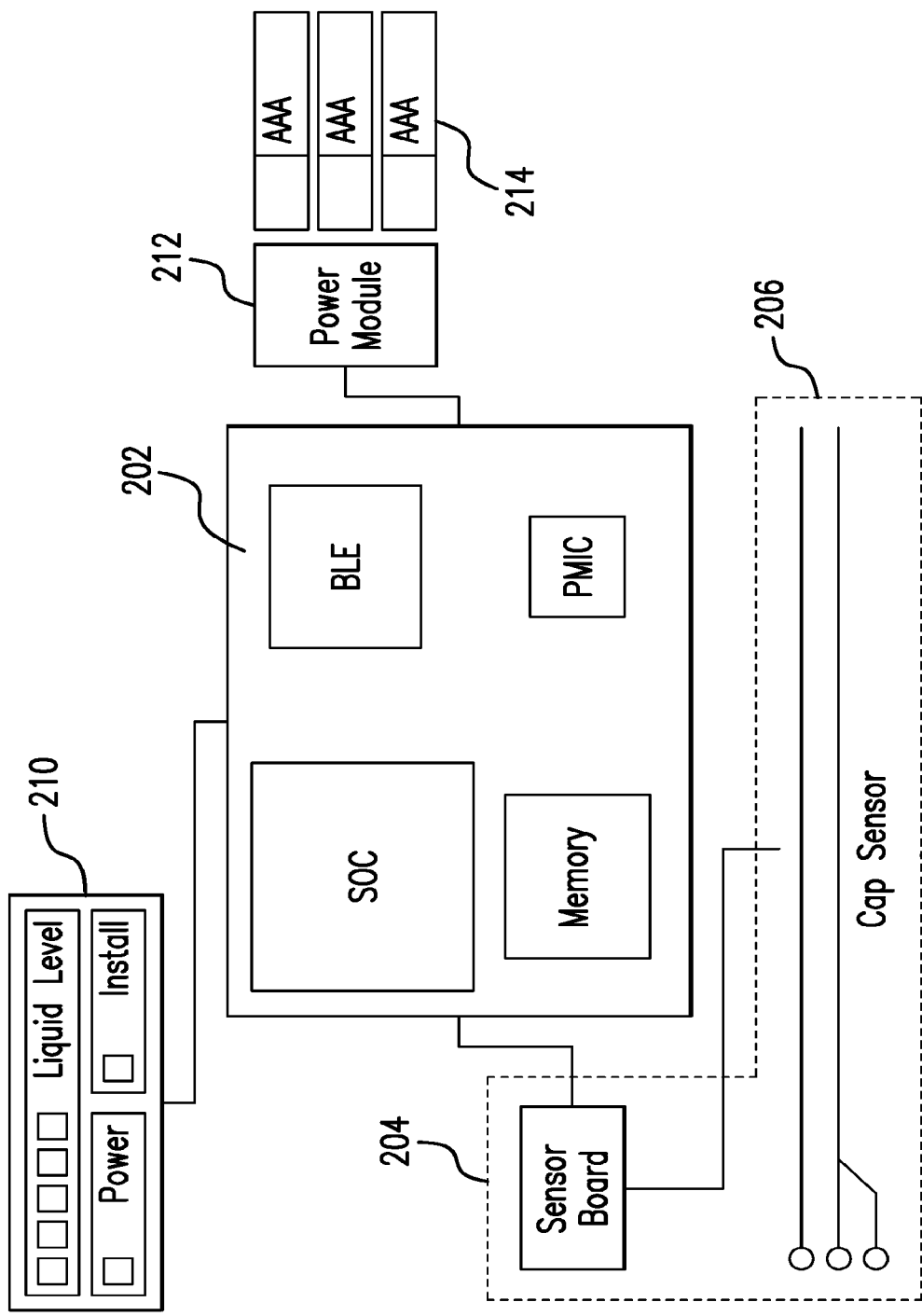
FIG. 2 illustrates an exemplary electrical block for use with a dispenser.

FIG. 2 illustrates an exemplary "electrical block" 200 that may be included in association with the aforementioned dispenser 104. Within the electrical block are illustrated a main printed circuit board 202, which may include, by way of nonlimiting example, processing, memory, and/or network communication capabilities; a sensor board 204 that may electrically associate with the conductive strips 106 of the consumable label to form a capacitive or like-sensing circuit 206; a display module 210, whereby liquid levels, power, or the replenishment, or the like may be indicated to the user; and a power module 212 that powers the electrical block and which may have associated therewith one or more batteries 214. Of note, firmware, running in association with the main printed circuit board 202 and/or with the display module 210 may apply one or more algorithms to use the available indicators, such as the LED lights and/or audio indicators, in different manners in order to indicate different functionality, such as varying lighting, beeps, or the like to indicate different states of the liquid levels and/or dosing to a user.

Figure 3:
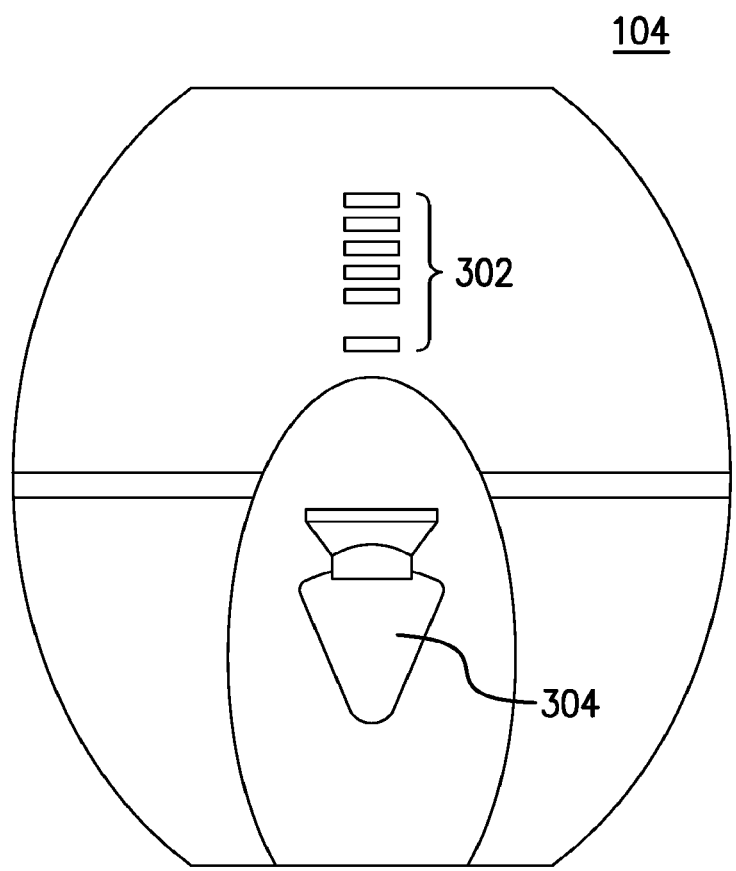
FIG. 3 illustrates an exemplary dispenser.
Figure 4:
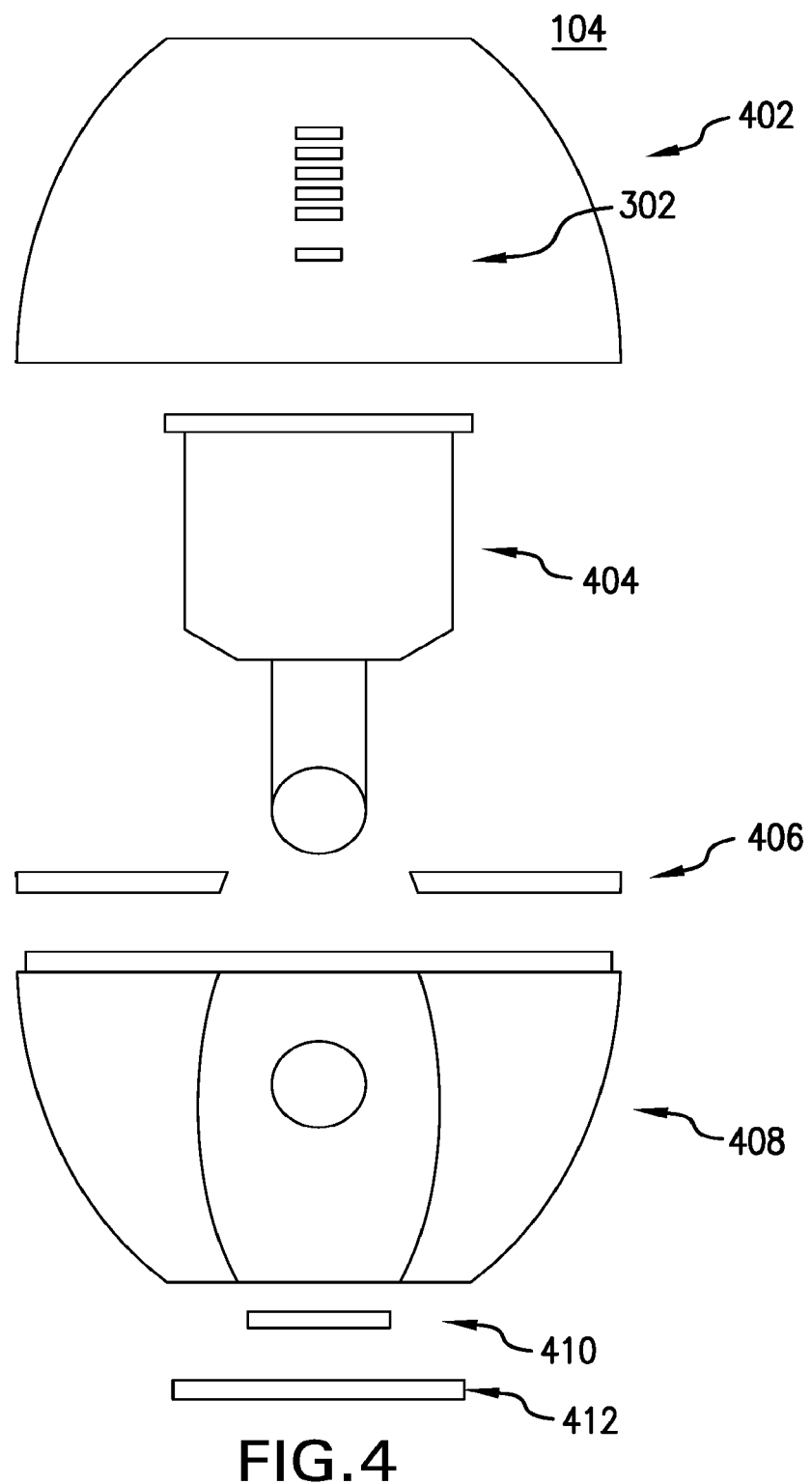
FIG. 4 illustrates an exemplary dispenser.

FIG. 3 illustrates a particular exemplary embodiment of a dispenser 104 having associated therewith 6 LED indicators 302 and a push button spigot 304. As further indicated in the breakout view illustrated in FIG. 4, the dispenser 104 may include a top cover 402, which may include lighting or other indicators 302; a middle frame 404, such as to provide structural support and at least a portion of the fluid pathway 130 for receiving the consumable cap and neck; a sealing ring 406, such as in order to prevent leakage from a consumable placed within the dispenser 104; and a bottom cover 408, such as may include a battery compartment door 410 for insertion of power/batteries, and a stability enhancer 412, such as a rubber pad, legs, or the like to enhance stability of the dispenser.

Figure 5A:
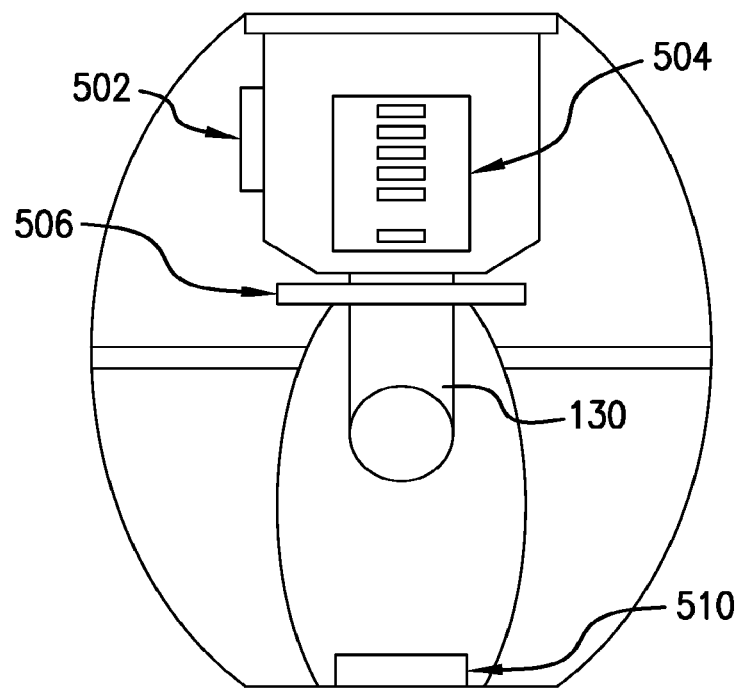
FIGS. 5A and 5B illustrate a front view and a top view of a cross section of an exemplary dispenser.
Figure 5B:
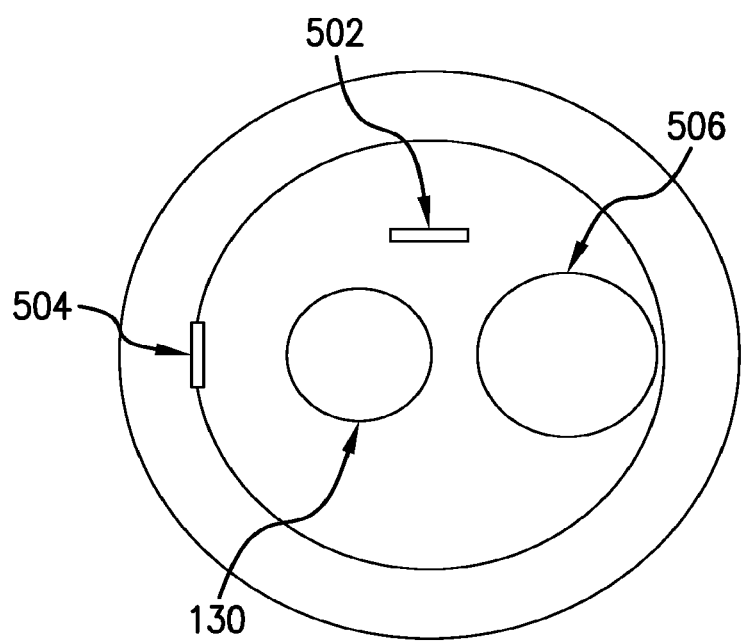

FIGS. 5A and 5B illustrate a front view and top view, respectively, of cross-sections of an exemplary dispenser 104. As illustrated, the top most portion of the dispenser may include a sensor board 502, a display board 504, a main PCB board 506, and so on. Further illustrated is a portion of the aforementioned fluid pathway 130. The bottom portion of the dispenser may include one or more power modules 510, such as may include one or more batteries and battery compartments.

Figure 6A:
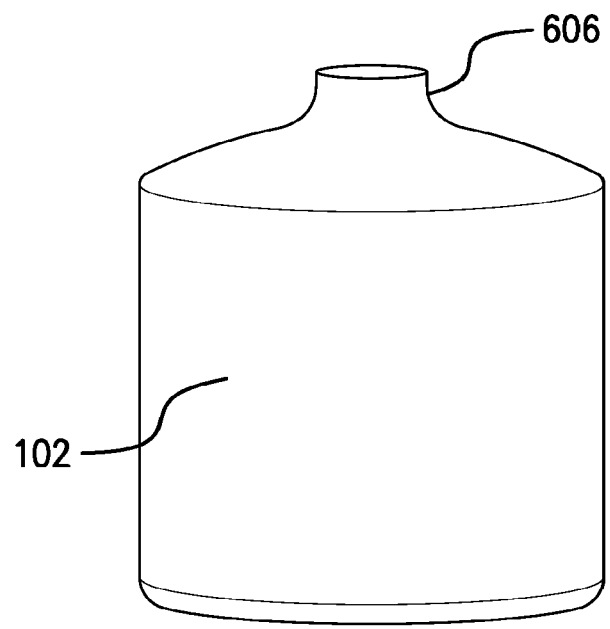
FIGS. 6A, 6B and 6C illustrate exemplary aspects of a consumable.
Figure 6B:
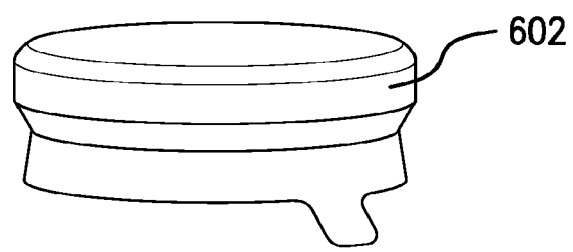
Figure 6C:
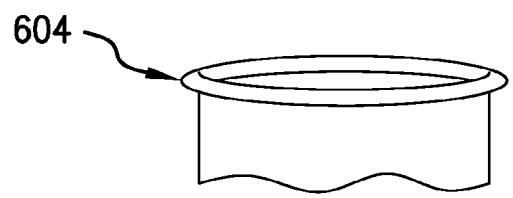

FIG. 6 illustrates a consumable 102, such as is referenced throughout. FIG. 6A illustrates a typical 5 gallon water cooler consumable 102. FIG. 6B illustrates a plastic top cap 602 that may typically associated with such a water consumable 102, and FIG. 6C illustrates a foil barrier 604 that may be associated with the upper neck/cap portion 606 of the watercooler consumable 102, and which is visible only after removal of the plastic top cap 602. Of note, the consumable of FIG. 6A may be inverted after removal of the plastic top cap 602 and inserted into the dispenser 104 discussed throughout. Upon such an insertion, the foil barrier 604 of FIG. 6C may be pierced, and liquid may flow through the fluid pathway 130 to provide availability of the liquid at the spigot of the dispenser 104. Of note, the foil or like-cover of FIG. 6C may have associated therewith an electronic identification, such that, before or after piercing, the dispenser may "read" the type of consumable and other consumable-related information, such as the manufacturer of the consumable, the capacity of the consumable, the composition of the contents of the consumable, and so on.

Figure 7A:
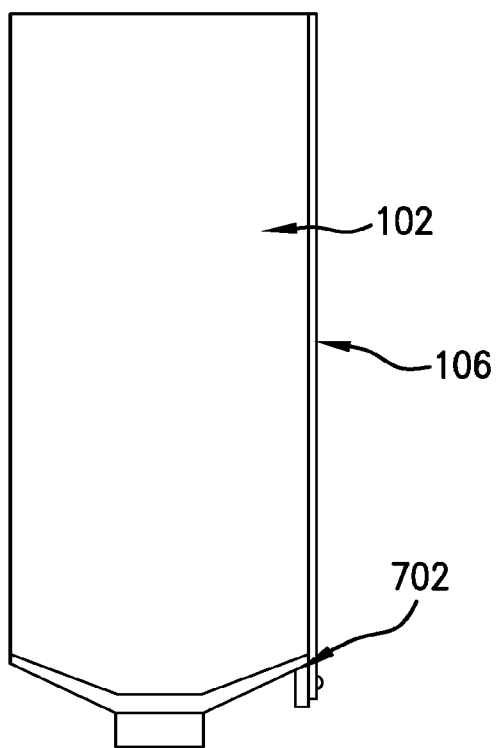
FIGS. 7A and 7B illustrate exemplary aspects of a consumable.
Figure 7B:
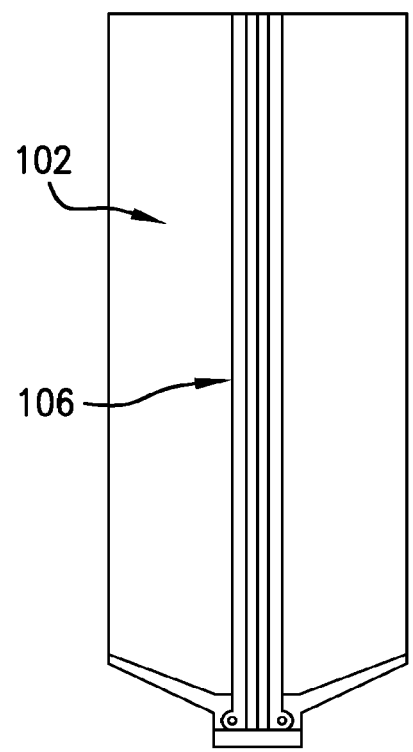

Figures at 7A and 7B illustrate an exemplary sensing label 106 as may be associated with the label of a consumable 102. FIG. 7A illustrates a front view, and FIG. 7B a side view, of an embodiment having a plurality of capacitive sensing strips 106 that extend into a tab 702, wherein the tab may be inserted into/onto the electrical contact 110 portion of the dispenser, such as the electrical contact illustrated in FIGS. 1A and 1B.

Figure 8:
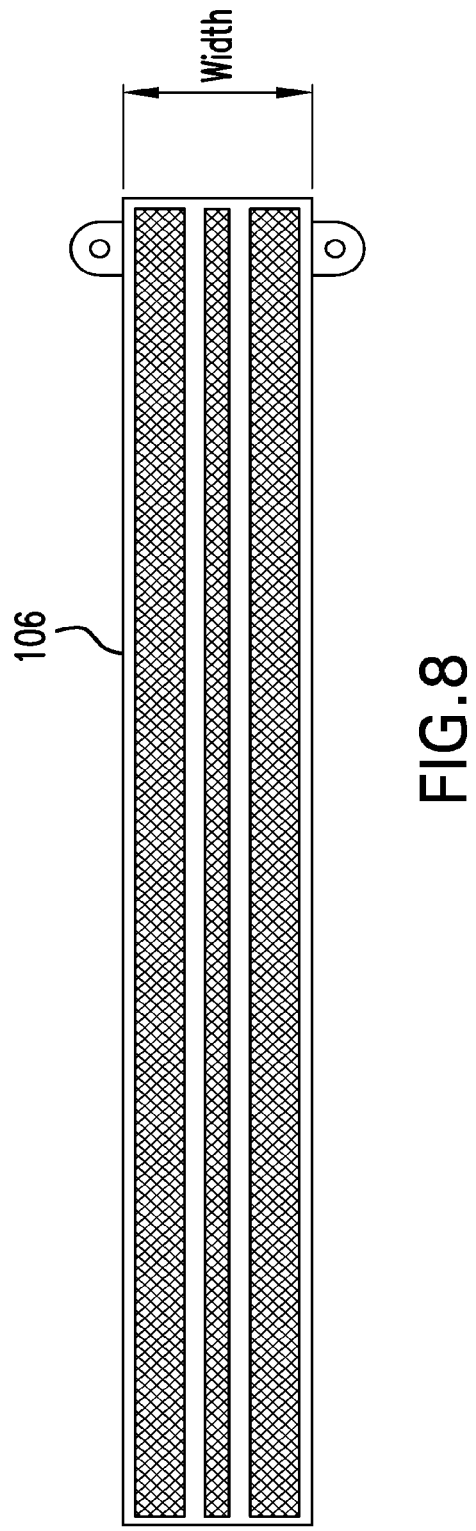
FIG. 8 illustrates exemplary conductive strips for use in the embodiments.

FIG. 8 illustrates an exemplary one of the sensor/conductive strips 106 for association with a consumable 102 and/or a consumable label. These strips 106 may have any dimensions suitable for association with or within the label, and suitable for forming full electrical contact with an aspect of the dispenser. By way of nonlimiting example, these sensing strips may have a length substantially equivalent to the full length of the consumable, and may have a width of, by way of nonlimiting example, 10 to 30 mm, or 20 mm.

Figure 9:
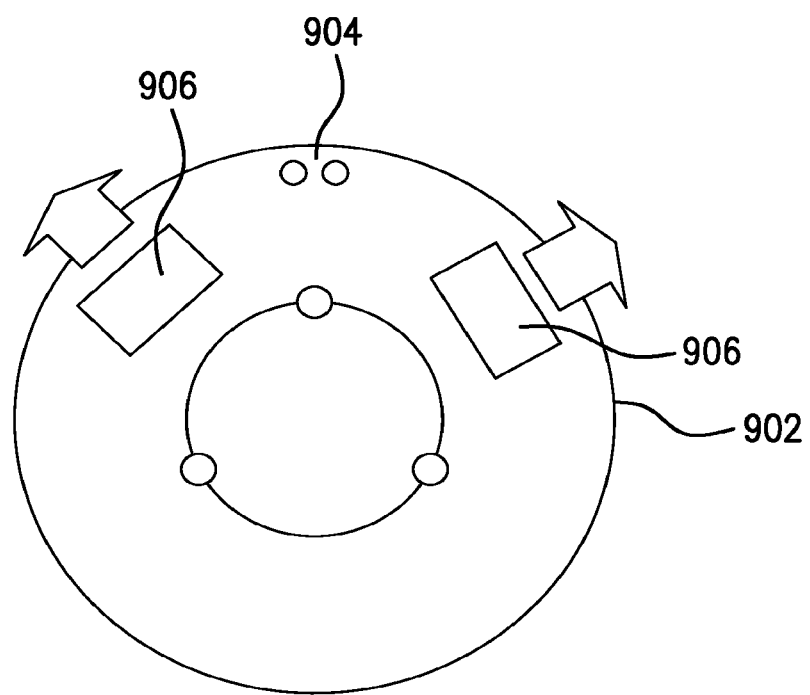
FIG. 9 illustrates an exemplary printed circuit board.

FIG. 9 shows an exemplary embodiment of a main PCB board 902. Of note, an exemplary PCB board 902 such as the one shown may have a circular form, such as with an outer diameter of approximately 35 mm. Further, an exemplary thickness of the PCB may be approximately 1 mm. The main PCB board shown 902, by way of nonlimiting example only, includes receptivity to power 904, and one or more flex connectors 906, such as may be associated with an electrical contact 110, such as an electrical slot for receiving a conductive strip tab as discussed throughout.

Figure 10:
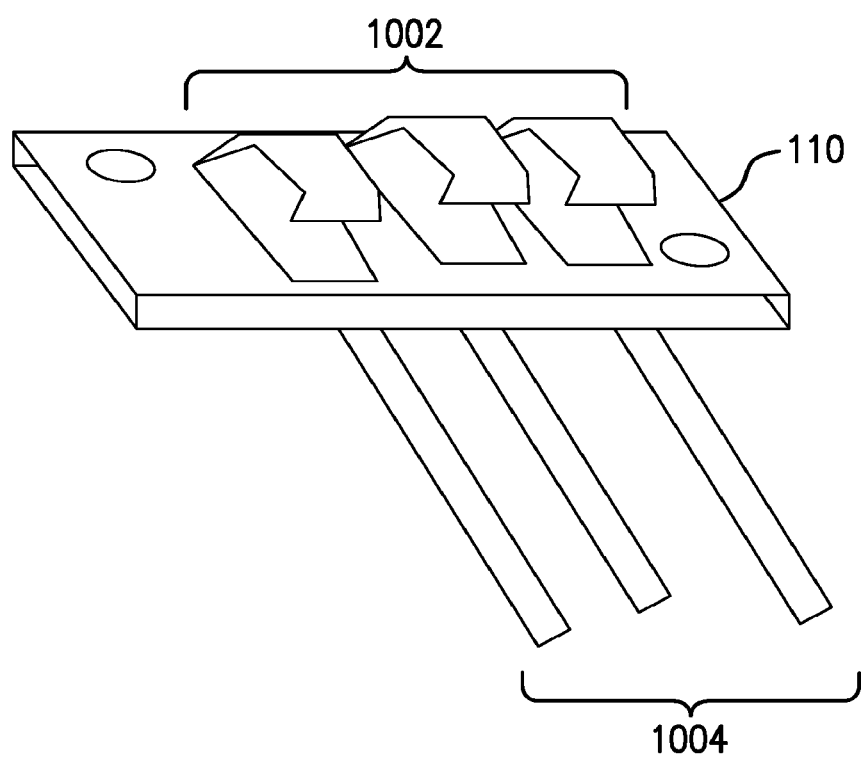
FIG. 10 illustrates an exemplary electrical contact.

By way of nonlimiting example, FIG. 10 illustrates an exemplary electrical contact 110 that may be located within a slot for reception of the conductive strip, tab, or the like which may be resident within that portion of the dispenser 104 receives the neck of the consumable. As shown, the electrical contact may have a number of spring contacts 1002 commensurate with the number of conductive strips 106 associated with the bottle label, and these electrical contacts 1002 may create an electromagnetic field around the conductive strips 106, for which the rate of oscillation is indicative of liquid levels. These oscillating current levels may be passed electrically down the wires 1004 from the electrical contact 110 to, for example, the sensing module, such that this electrical signal information may be processed into a liquid level indication.

Figure 11A:
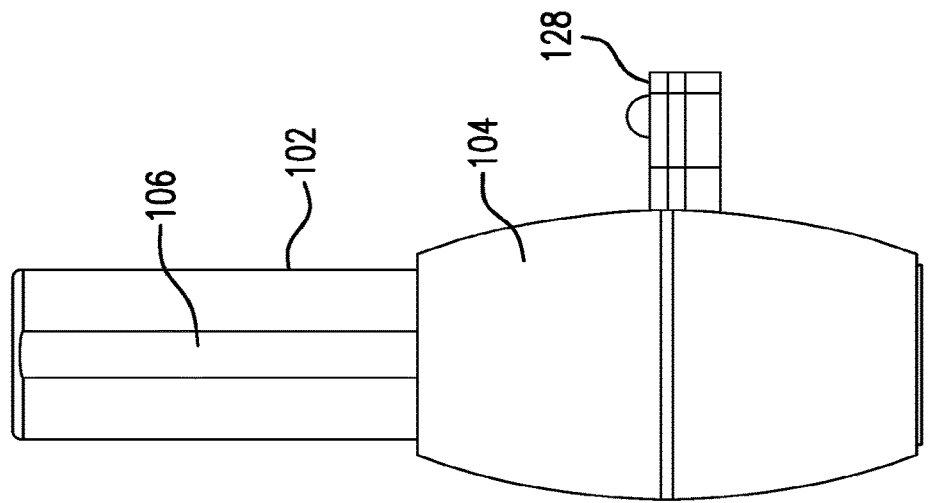
FIGS. 11A, 11B, 11C, 11D, and 11E illustrates exemplary aspects in various views of a consumable and a dispenser.
Figure 11B:
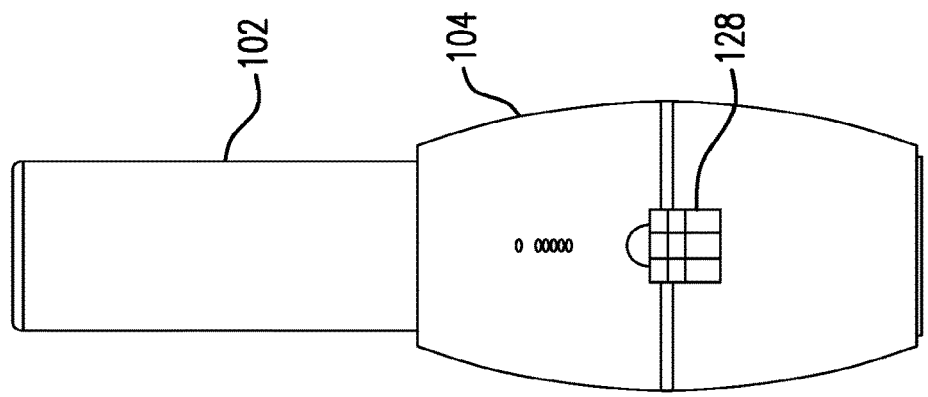
Figure 11C:
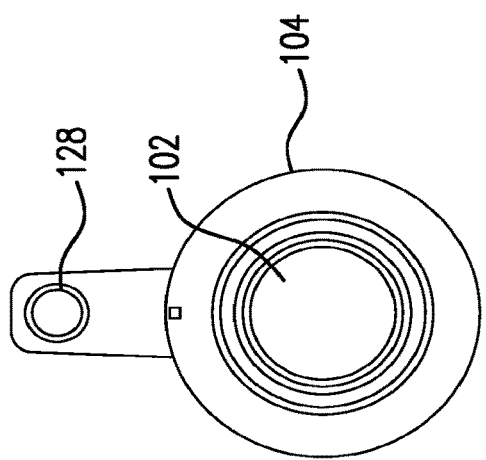
Figure 11D:
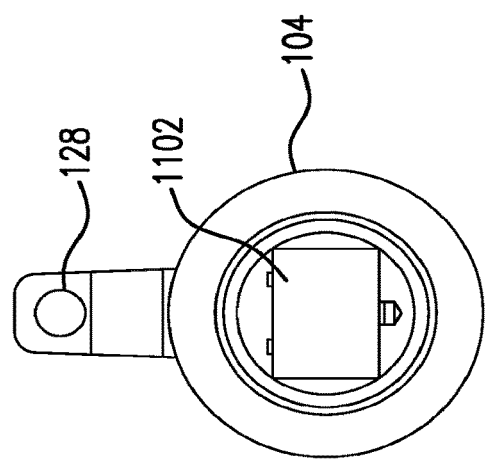
Figure 11E:
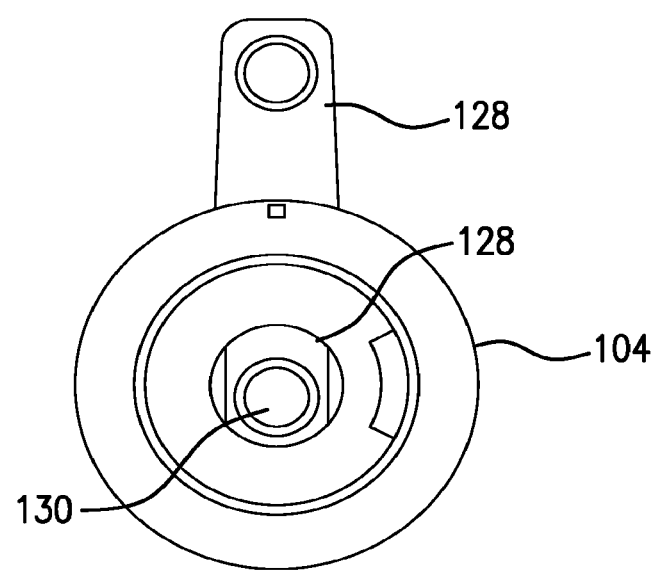

FIGS. 11A, 11B, 11C, 11D, and 11E illustrate a dispenser 104, and FIGS. 11A, 11C and 11D illustrate a consumable 102 associated with the dispenser 104. The conductive strips 106 that may form part of the capacitive sensing module 206 are shown in FIG. 11D. More particularly, Figure A illustrates a top view of the dispenser 104 with a consumable 102 inserted. FIG. 11B illustrates a bottom in view of the dispenser 104, with a door 1102 leading to the battery compartment, and with a spigot 128 evident at the top most portion thereof. FIG. 11E illustrates the portion of the dispenser 104 that is receptive to the bottleneck and consumable cap portion, but without the consumable 102 inserted therein. Evident in FIG. 11E is the o-ring 128 to prevent leaks, and the entrance to the fluid pathway 130 into which the liquid will be dispensed upon inverted insertion of the consumable 102 into the dispenser 104.

Figure 12:
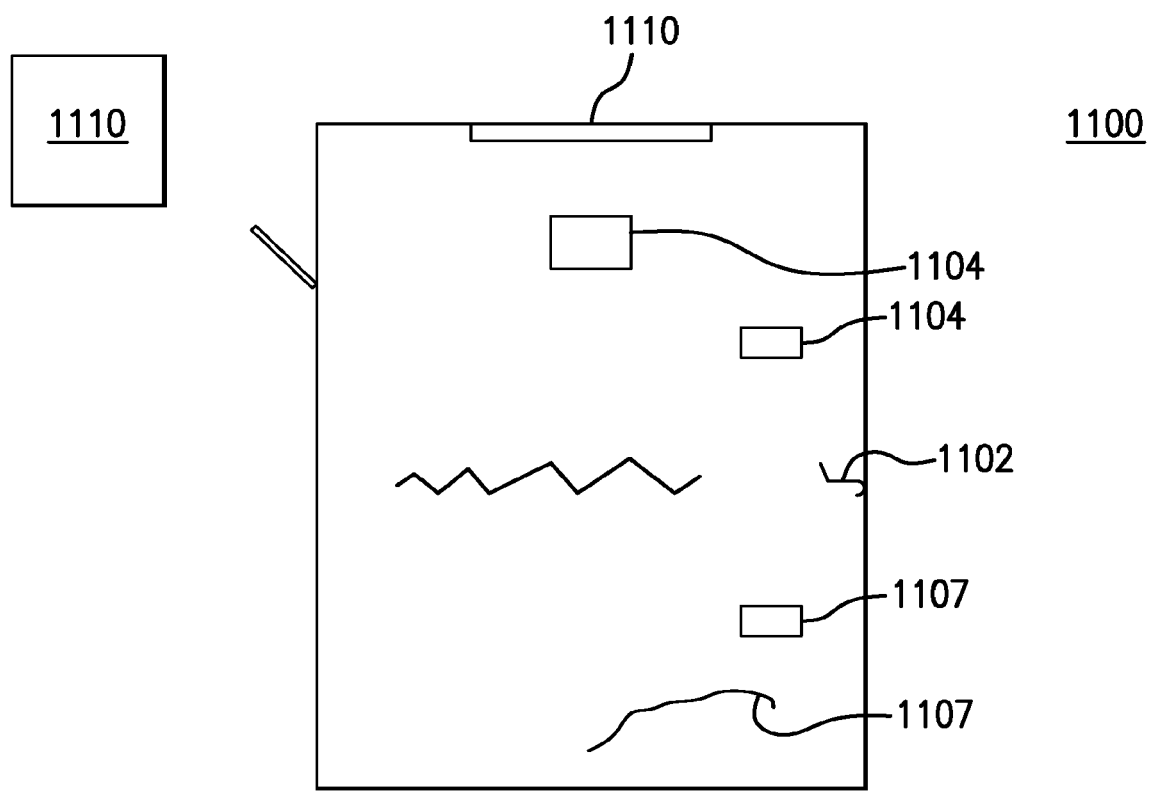
FIG. 12 illustrates aspects of the embodiments.

FIG. 12 illustrates the tracking of the solids performed while the solids reside in a container. The container may be a container 1100 in which the solids 1102 were purchased in the example of FIG. 12, although other containers may be employed as discussed throughout. The container may include one or more active or passive capabilities for sensing 1104 of the contents of the container, and/or sensing of doses dispensed from the container. By way of non-limiting example, the container may be a cereal box and hence the contents may be cereal, and additionally the active or passive sensing aspect may be one or more smart labels placed upon the cereal box.

The solids sensing employed herein may be any one or more types of sensing suitable for sensing the contents of the box or doses dispensed from the box. By way of example, the sensing may be one or more photo conductive material sensors, which may be printed around at least a portion of the label of the container. Thereby, as portions of the label are uncovered, i.e., as the amount of solids within the container decreases, the photo conductive material senses the additional light that now hits the photo conductive label sensor. Thereby, the level of solids is sensed as indicated by the light received by the photo conductive label.

Of course, a variety of other sensing methodologies may be employed, such as, but not limited to, infrared, ultrasound, proximity sensing, other types of light sensing, derivative sensing, weight sensing, sound sensing, or resistance/conductance sensing, by way of non-limiting example. Needless to say, one or more of the foregoing sensing methodologies may vary in the uniformity of the sensing output, such as in accordance with the type of bulk solid 1102 item or liquid placed within the container. Therefore, adjustments may be necessary in the type of sensing used, and/or in the processing of the sensor output, in order to properly sense different types of items.

In accordance with the foregoing, the sensor output may be active or passive, as discussed. By way of non-limiting example, a photoconductive strip may measure ambient light (passive) or light emitted by an LED powered by the system (active). In either case, the output of the sensor must be provided to a processing system 1110. This may be done by any of a variety of methods. For example, a highly simplistic processor may be included on the container in association with the sensor. In such cases, the processor may include some wireless communication capabilities, such as RF, infrared, Bluetooth, Wi Fi, or the like, or communication with the processing chip may occur based on an active external interrogation of the processing chip. Alternatively, the one or more processors may be off-container as discussed throughout, and hence may form part of a system that actively interrogates the container to obtain the requisite sensing output, as is also discussed further hereinbelow with respect to FIG. 13.

Figure 13:
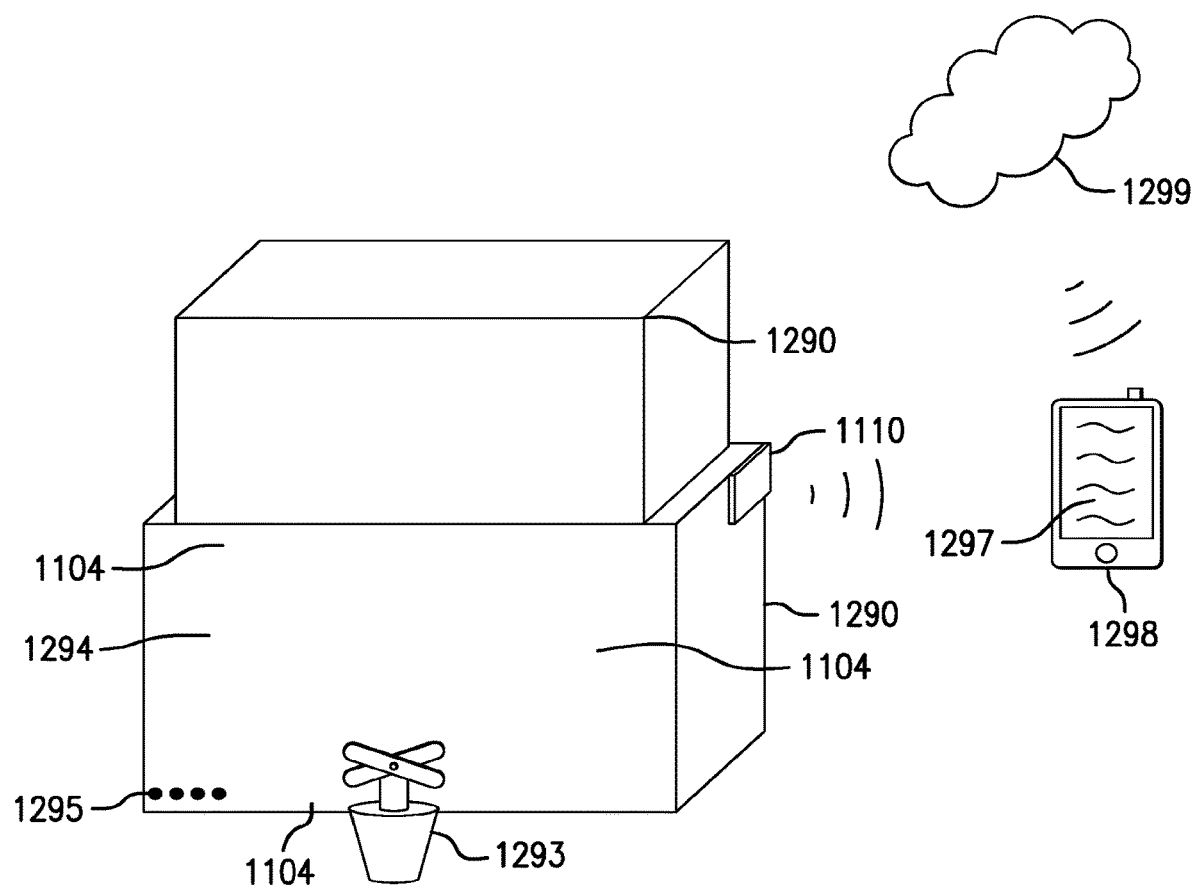
FIG. 13 illustrates aspects of the embodiments.

FIG. 13 illustrates an embodiment in which either a container 1290 is placed into a dispensing base unit 1292, or the contents 1294 to be sensed are dispensed into a container physically associated with a dispensing unit. As such, the cereal dispensing unit may include a container, or may encompass a container placed therein, in whole or in part.

In the embodiment of FIG. 13, and as discussed above with respect to FIG. 12, the sensing capabilities may be provided on a container placed into the dispensing unit. Additionally and alternatively, the sensing may be provided in association with the container of the dispensing unit, or in association with the dispensing unit itself, such as wherein the sides of the dispensing unit rise a substantial amount up to encompass a container placed therein and allow association of sensing capabilities placed within the dispensing unit with a container placed therein. Likewise, the processing discussed above with respect to FIG. 12 and/or the external communications discussed above with respect to FIG. 12 may be provided in the dispenser unit of FIG. 13. As is the case with the embodiments of FIGS. 12 and 13, after processing the sensed information may be wired or wirelessly communicated to one or more information processing systems, such as telephonic or desktop applications, suitable to convey information regarding the need to replenish or the state of dispensing of the solids associated with the container. This communication may occur directly with a proximate device 1298, or may occur remotely, such as via the internet, cloud communications, the cellular network, or the like.

As referenced with respect to FIG. 12, the type of sensing used, and/or the propriety of the use of different types of sensing, may vary with the uniformity of the bulk solids within a container. Needless to say, the foregoing may also vary with the size and shape of a container, such as the size of the container placed into a dispenser, and they also vary as to the most suitable location for sensing. By way of non limiting example, the dispenser in the embodiment of FIG. 13 may include the most suitable sensing location within the dose dispenser associated with the dispensing unit. Similarly, in the embodiment of FIG. 13, different types of sensing may be used or otherwise activated by the dispenser and/or the processor associated with the dispenser, such as based on the characteristics of the container or bulk solid placed within the dispensing unit.

The dispensing base may include a dispenser 1293, such as a crank, spout with spigot, or the like, for the dispensing of the solids from the container received into the base. The dispenser base and the dispenser may be, by way of non-limiting example, plastic in composition, and/or may be substantially injection molded, such as with one or more actuation elements, such as a handle, switch, button, or the like.

The base may include one or more indicator LEDs 1295 to indicate dosage and auto replenishment; one or more network communication capable modules, such as for communicating with a smart phone, local area network, cellular network, or the like; one or more power modules to provide power to the base modules, and which may include batteries that may be permanent/semipermanent (i.e., rechargeable) or replaceable; and or other optional elements, such as one or more audio alarms to support or replace the LED indicators of correct dosage or auto replenishment.

Further included may be firmware and software to provide the functionality discussed throughout. For example, firmware may sense the solids level based on the intercommunication of the sensing and the processing, and may use this information to indicate dosing or auto replenishment. Likewise, dosing, and/or auto replenishment, may be information provided remotely from cloud-based algorithms, such as to the firmware of the base.

As referenced, the disclosed communication capabilities may include communication with one or more smartphone apps 1297 having user information associated therewith, and which may receive user feedback regarding levels, dosing, auto replenishments, and so on. Such a smart phone app may communicate with the base via, for example, WiFi, Bluetooth, BLE, or cellular communication methodologies, and further, the firmware of the base may be suitable to batch information and data and/or otherwise piggyback to a smart phone having resident thereon the referenced app.

Further, a cloud-based backend 1299 may store and serve received data to and from the aforementioned app, and to or from one or more web-based or app-based dashboards. Some or all of the additional processing discussed throughout may be performed at the cloud based backend, such as alerts or email confirmations in the circumstances of auto replenishment, such as instead of drawing on the limited resources of the dispensing base's firmware or processors.

As discussed throughout, the automatic reordering envisioned herein may reflect a need to reorder not only a consumable, but additionally a durable aspect of the disclosed system. By way of non-limiting example, durable and consumable pairs may include: razors and razor blades; a soap dispenser and a soap or shampoo bottle; a hand soap dispenser and a refill soap bag; a cereal box and a turning crank cereal dispenser; a printer and an ink cartridge; a disposable detergent bottle and an ergonomic spigot dispenser; a spice rack and a spice bottle; a centrifuge and a vial of bodily fluid; and a coffee machine and coffee, tea, or other beverage pods.

In prior efforts, the smart label of a consumable has been read by a durable with which the consumable is paired solely in order to identify the consumable. That is, a consumable may typically be associated with and RFID or NFC Tag, a Q.R. code, a barcode, a UPC code, or the like, which, when read by a paired durable, serves merely to identify the consumable. In contrast, the proposed embodiments may, embed semi-smart and smart labels on or in the consumables such that a wealth of information beyond identification may be sensed or otherwise conveyed to and by the paired durable, such as exclusively and only upon pairing of the consumable with the durable. That is, the durable may include a plurality of conventional electronics designed to sense/read the detailed consumable information provided by the semi-smart label of the consumable. Accordingly, the disclosed embodiments may provide functionality beyond mere identification, and may provide significant cost advantages over RFID, NFC, or optical reading methods previously provided for the consumable and durable pair.

Such functionality may be provided, such as only upon pairing of the consumable with the durable, by any of a variety of methods that will be understood to the skilled artisan in light of the discussion herein. For example, discussed throughout are capacitive proximity sensing, light sensing (such as using photo resistive sensors), and conductivity or resistivity sensing (wherein electrically unconnected portions of the system are subsequently connected to indicate a content level) to provide content identification for consumable items.

Figure 14A:
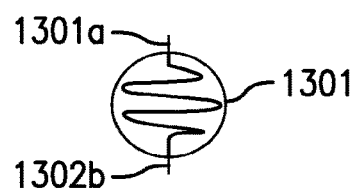
FIGS. 14A and 14B illustrate aspects of the embodiments.
Figure 14B:
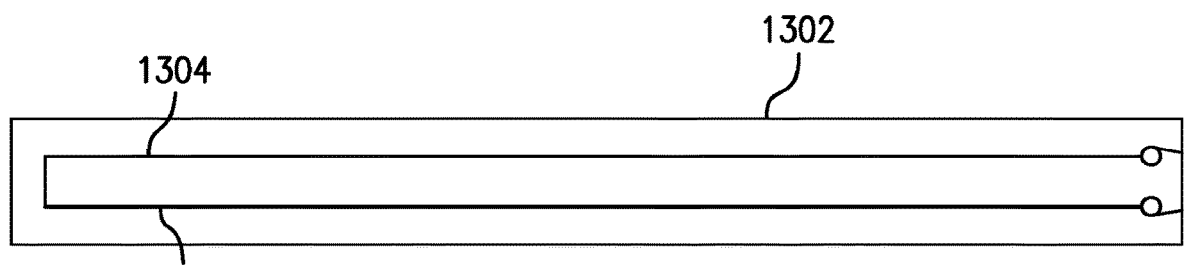

By way of non-limiting example, FIG. 14A illustrates the use of photo resistors 1301 to provide content sensing. In the embodiment illustrated, a photo resistive label 1302, such as that illustrated in FIG. 14B, is comprised of a conductive trace 1304 communicatively associated with a photo resistive trace 1306. As will be understood, conductive trace 1304 may be silver based, and the photo resistive trace may be a printed zinc oxide based ink, by way of non-limiting example. The anode and cathode provided by the connectively associated traces provide a sensing circuit 1308 which, upon variations in the level of product that blocks the photo resistive trace 1306, indicates a level of the contents 1320 associated with the photo resistive label 1302.

Figure 15B:
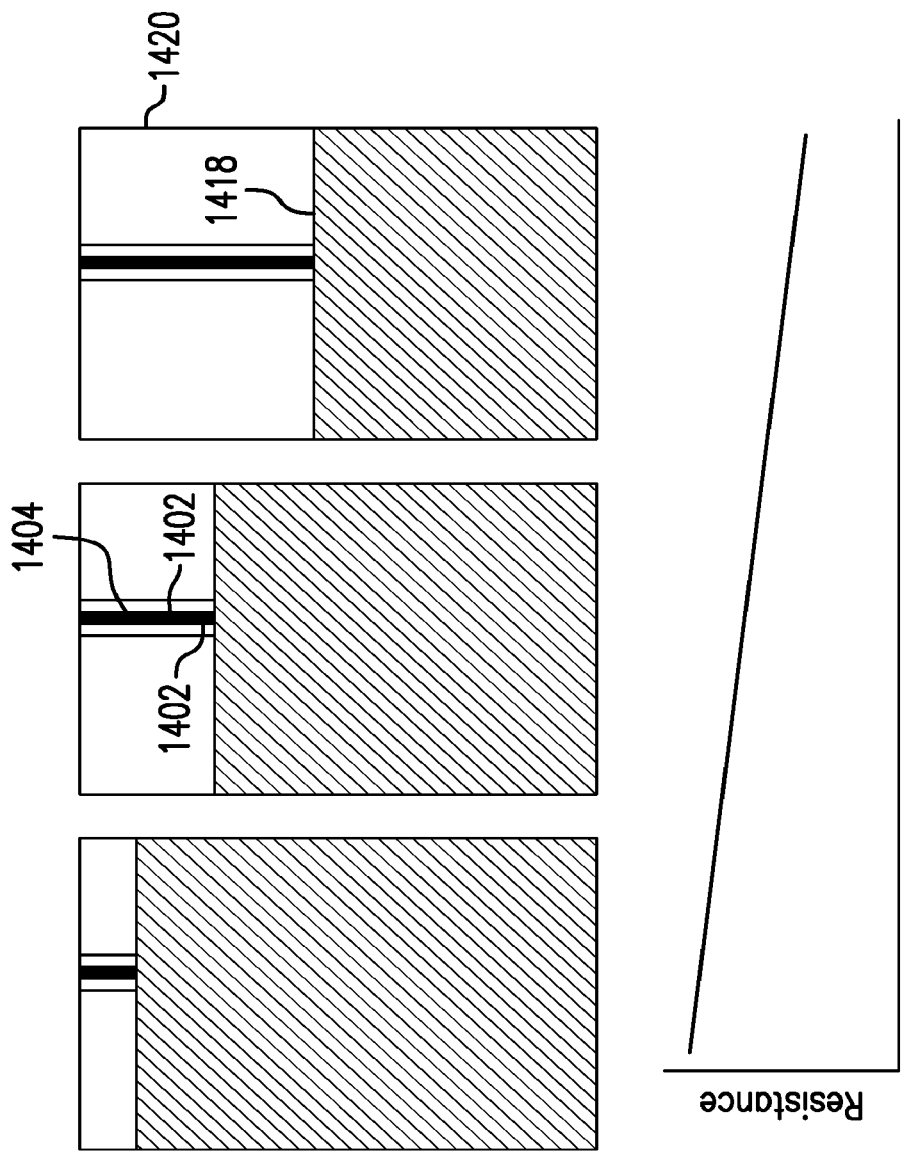

Additionally, and alternatively, FIG. 15A illustrates the use of a commoditized series of individual photo resistors 1402, which also may be comprised of a photo resistive film 1404, such as cadmium sulfide, provided between electrical contacts, wherein a series of such photo resistors 1402 may be placed along a conductive strip 1406 to provide similar functionality to the photo resistive printed label of FIG. 14B. FIGS. 15A and 15B illustrate, schematically, and graphically, variations in content level that may be sentenced based on the progressive exposure of photo resistors. Of note, the illustrated photo resistors may comprise a strip of individual photo resistors, as discussed with respect to FIG. 15A, or may comprise a printed trace photo resistive label, such as is discussed with respect to FIG. 15B.

Figure 15B:
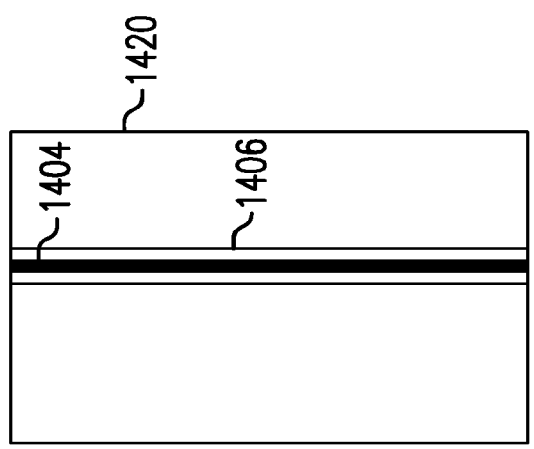

In the illustration of FIGS. 15, as the product content level drops, more photo resistive sensors are exposed and the resistance of the circuit drops. This is also graphically illustrated in correspondence to the change in level sensing by the resistance graph shown in FIGS. 15A and 15B. In such embodiments, level sensing occurs at discrete levels correspondent to the presence of each individual photo resistor along the strip in FIG. 15A, or improved and substantially continuous resolution may be achieved by using the photo resistors strip of FIG. 15B.

More particularly, FIG. 15B illustrates, schematically and graphically, the level sentencing with the use of a photo resistive printed trace 1404. As shown in the illustration of FIG. 15B, the photo resistive strip may be printed to cover the full height of the container/consumable 1420. As the content level within the container 1420 drops, the exposure locations along the strip increase and the resistance accordingly drops in a manner akin to that discussed above with respect to FIGS. 15A and 14B. However, in contrast to FIG. 15A, the embodiment of FIG. 15B provides continuous level sensing and a linear drop in resistance, as is illustrated graphically, in correspondence with the change in container levels. Moreover, the resistance of the overall circuit may be modified by changing the thickness of the ink layer and or the width of the print of the photo resistive strip 1404. Thereby, the range and/or resolution of the photo resistive sensing circuit may be modified or calibrated for different contents that may reside within the container 1420.

It will be appreciated that the foregoing embodiments may also work for liquids having a certain opacity, and for uniformly sized items that need to be counted, as well as for bulk solids sensing discussed throughout. In fact, the same "universal container" could be filled with any of several substances without substantially affecting its ability to sense product level. That is, provided herein is an inexpensive method to continuously detect change in product level by sensing a change in resistance for solids or liquids.

It will be understood that the durable discussed throughout may be generic or proprietary. That is, a proprietary durable may be operable only with a particular brand of consumables, and hence other brands of the same type of consumable will not operate with the proprietary durable. Modification of the aspects discussed herein, such as customization in aspects of a printed photo resistive label, may make it difficult to genericize a proprietary durable. Thereby, a proprietary durable may enhance brand loyalty for certain categories of consumables.

Figure 16:
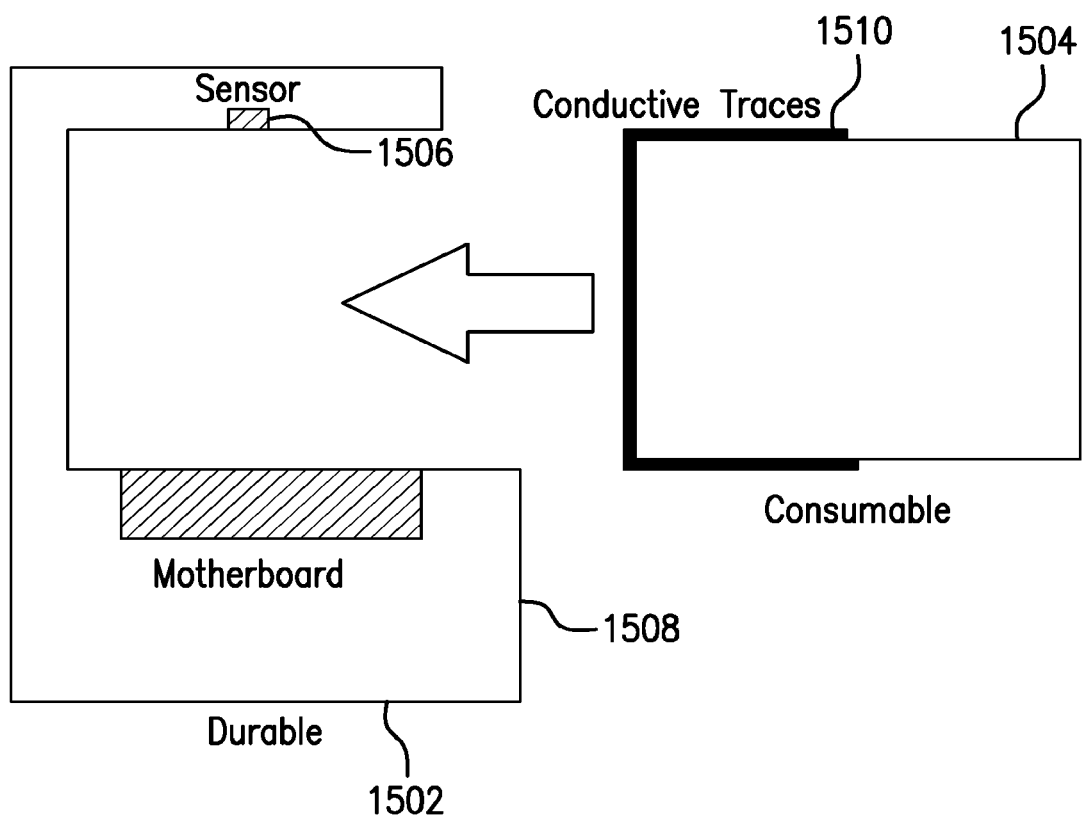
FIG. 16 illustrates aspects of the embodiments.

More particularly, FIG. 16 illustrates the association of a durable 1502 and consumable 1504, such as for a proprietary durable. As illustrated, both a sensing circuit 1506 and motherboard 1508 may be provided in the durable, but may not be connected to one another. The printed traces 1510, such as photo resistive label traces, on the consumable 1504 may connect the sensing circuit 1506 and the motherboard 1508 within the durable 1502 only when the consumable

1504 is placed within the durable. Thereafter, level sensing of the product within the consumable 1504 may be performed as discussed throughout, such as based on the resistance of the consumable as sensed by the sensor and motherboard of the durable. As referenced above, the durable may thus be generic, or may include proprietary modifications, such as to the sensing circuit, the motherboard, the communication protocols between the sensing circuit on the motherboard, the type, size or makeup of the conductive traces, the printing label printing methods, and so on.

Figure 17A:
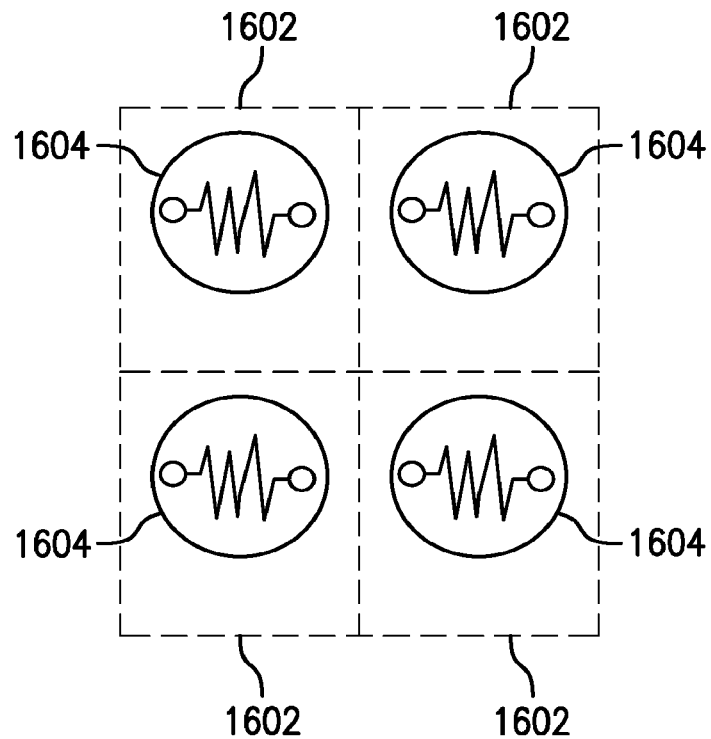
FIGS. 17A and 17B illustrate aspects of the embodiments.
Figure 17B:
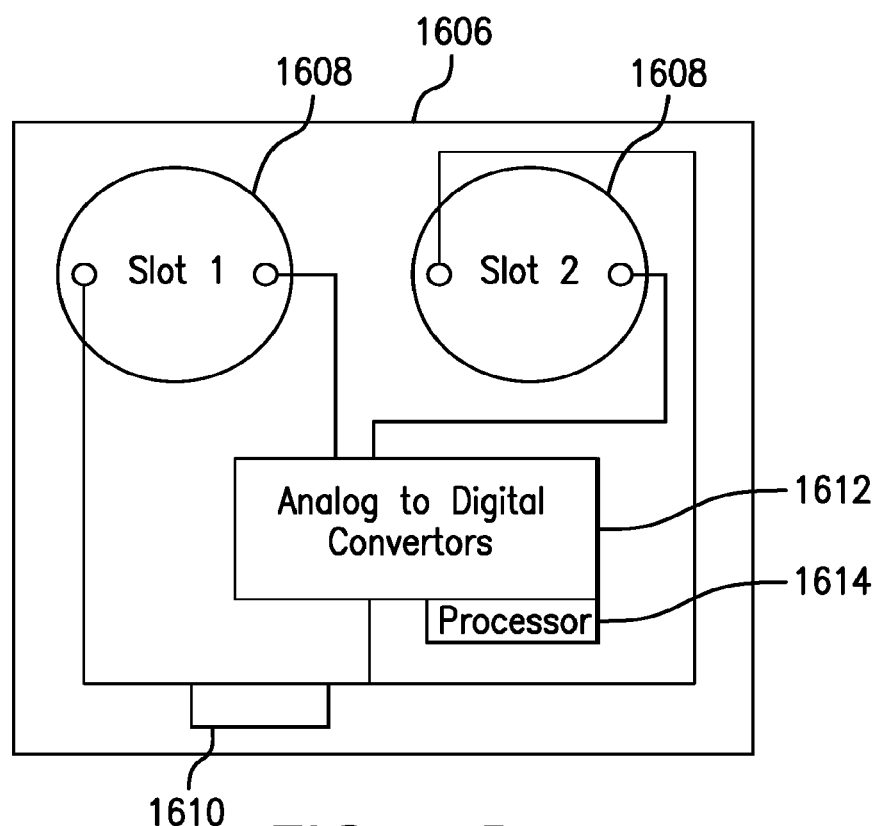

FIGS. 17A and 17B illustrate a resistance-based product identification that may be provided in accordance with the embodiments. Each consumable label 1602 may be printed with a resistive trace 1604, such as a polymer resistive material. The value of the resistive trace may be unique for each product identification, as shown.

The durable 1606 may then have slots 1608 connectively associated with power 1610 and the input-output of one or more analog to digital convertors 1612 associated with a microprocessor 1614, such as to identify the different resistance values of the resistive trace 1604 associated with a consumable placed within the slot 1608. Thereby, if multiple consumable items may be used in a single durable, the resistive sensing identifies which consumable was used. If multiple consumables may be simultaneously placed within the durable at multiple slots at the same time, the disclosed embodiment may identify which consumable is in which slot. It will be appreciated that the variations in resistance of the resistive trace may be provided by any known methods, such as variations in the shape, length, thickness, or type, such as the material composition, of the trace used.

In relation to the proprietary or non-proprietary nature of the durables as discussed above, the aforementioned dashboard may be associated with one or more sellers or brands of the referenced solids. In such circumstances, an analytics dashboard may be available to the brand for user and use data indicative of certain geography use, global use, use at times of the day, use by demographic area, or the like. This and additional information provided at the dashboard may allow for a brand to target or otherwise send special offers, discount codes, or the like to particular users, such as high-volume users.

Figure 18:
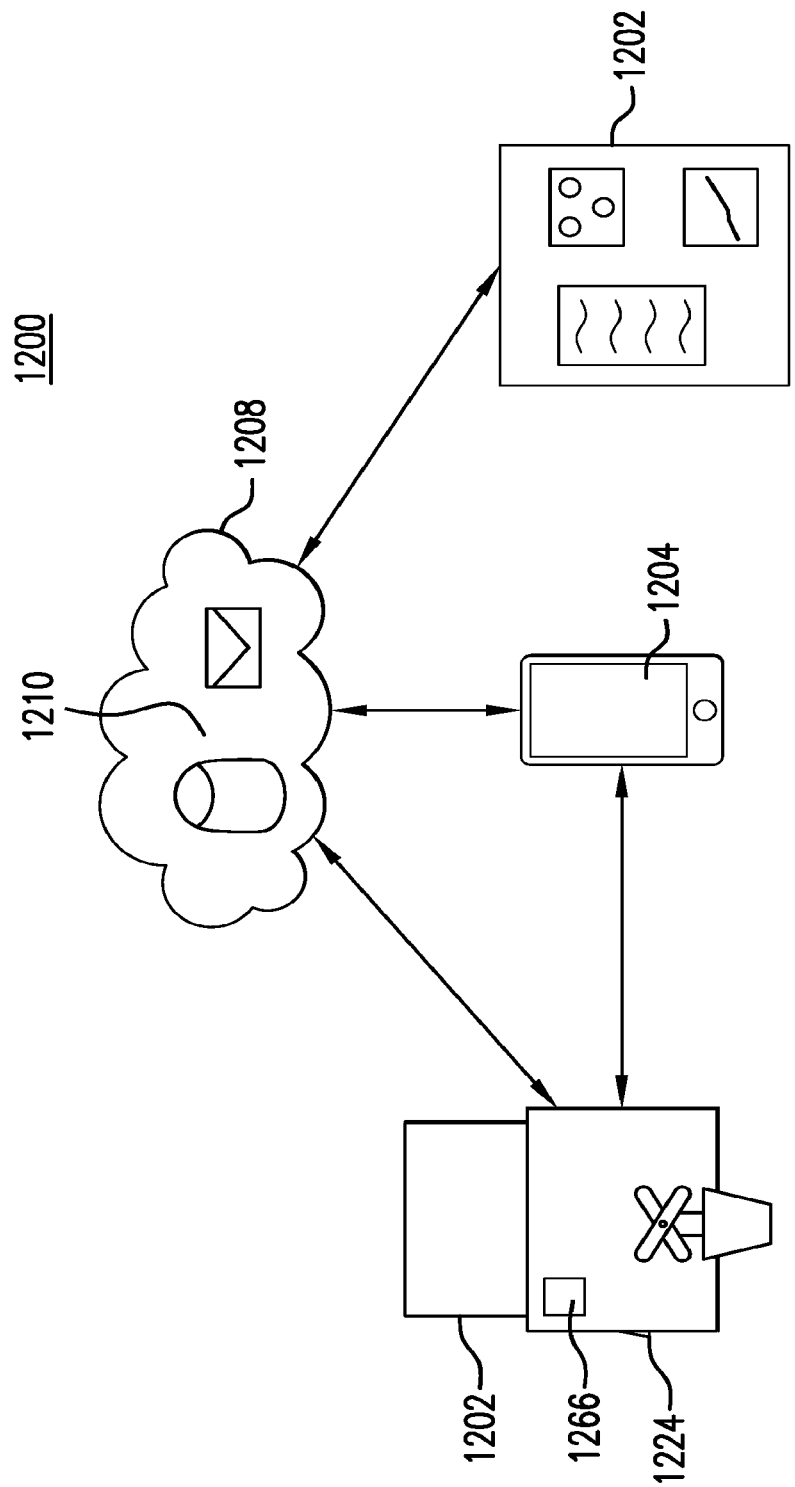
FIG. 18 illustrates an exemplary cloud-based system.

FIG. 18 illustrates a system 1200 in which the dashboard 1202 and/or smartphone app 1204 housing the code to implement the method(s) discussed herein throughout may be included. As shown, a container 1200 having associated there with sensors 1206 is inserted into a smart dispensing base 1224. The illustrated dispensing base is then suitable to communicate with a smartphone app to exchange the information discussed throughout. The smartphone app may then communicate with the cloud 1208, although it should be noted that the smart dispenser may additionally or alternatively communicate directly with the cloud 1208, such as via a Wi-Fi network. The cloud based backend 1210 may then communicate with the smartphone app 1204 and with the brand dashboard 1202, as discussed herein throughout.

In the foregoing Detailed Description, it can be seen that various features are grouped together in a single embodiment for the purpose of streamlining the disclosure. This method of disclosure is not to be interpreted as reflecting an intention that the embodiments require more features than are expressly recited herein.

What is claimed is:

1. A level monitoring system for association with a content-filled container, comprising:

a durable base capable of receiving the content-filled container, configured to dispense content via a dispenser due to gravitational pull on the content;

a partial circuit on the content-filled container that becomes a complete circuit upon insertion of the content-filled container into the durable base, thereby forming a sensing module suitable to sense a content level;

a spring-loaded connector in the durable base that snugs around a perimeter of the content-filled container to physically hold the content-filled container to the durable base, and to provide connectivity that completes the complete circuit of the sensing module; and a communications module suitable for receiving the content level from the sensing module, processing data and system state, and for communicating the content level to a user.

2. The system of claim 1, further comprising a power module for powering at least the sensing module and communications module.

3. The system of claim 1, wherein the sensing module comprises a plurality of sensors that sense at least one of proximity, light, weight, pressure, moisture, capacitance, oscillation frequency, and resistance.

4. The system of claim 1, wherein the partial circuit comprises a label.

5. The system of claim 4, wherein the label is applied via an in-mold labeling process.

6. The system of claim 4, wherein the label is applied by the user.

7. The system of claim 4, wherein the label consists of printed electronics.

8. The system of claim 7, wherein the printed electronics comprise the partial circuit printed directly onto the label.

9. The system of claim 8, wherein a shape and size of the partial circuit is tailored to the shape and size of the content-filled container.

10. The system of claim 1, wherein the dispenser comprises one of a crank, a spout, or a spigot.

11. The system of claim 1, wherein the durable base supplies power.

12. The system of claim 1, wherein the communications module includes a visual indicator located directly on the durable base.

13. The system of claim 1, wherein the content is a liquid.

14. The system of claim 1, wherein the content is a bulk solid.

15. The system of claim 1, wherein the content is dispensed via a fluid pathway in fluid communication with the content-filled container and the dispenser in fluid communication with the fluid pathway.

16. The system of claim 15, wherein the fluid pathway is substantially perpendicular to the direction of the gravitational pull acting on the content.

17. The system of claim 15, wherein the gravitational pull on the content provides sufficient downward force or head pressure so that the content enters the fluid pathway for output at a spigot.

18. The system of claim 15, wherein the fluid pathway is below the content-filled container.

19. The system of claim 15, wherein the fluid pathway, is in fluid communication with a neck or consumable cap of the content-filled container.

20. The system of claim 19, further comprising a leak seal configured to receive the neck or consumable cap of the content-filled container.

* * * * *